US006878493B1

(12) United States Patent
Ueda et al.

(10) Patent No.: US 6,878,493 B1
(45) Date of Patent: Apr. 12, 2005

(54) PROCESS AND SYSTEM OF MAKING HOLOGRAM-RECORDING DRY PLATES

(75) Inventors: Kenji Ueda, Tokyo (JP); Yasuyuki Ohyagi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/519,129

(22) Filed: Mar. 6, 2000

(30) Foreign Application Priority Data

Mar. 19, 1999 (JP) ............................................ 11-075998
Feb. 14, 2000 (JP) ........................................ 2000-035143

(51) Int. Cl.[7] ............................ G03H 1/02; G65H 5/08; G65H 1/04; B32B 31/04
(52) U.S. Cl. .............................. 430/1; 430/2; 430/321; 156/344; 156/354; 156/379.8; 156/521; 271/162; 271/30.1; 271/265.01; 271/268
(58) Field of Search ................................ 430/1, 2, 321; 156/521, 522, 354, 379.8, 344, 584; 271/11, 145, 268, 162, 265.01, 30.1

(56) References Cited

U.S. PATENT DOCUMENTS

| 3,779,778 A | * | 12/1973 | Smith et al. ................. 430/302 |
|---|---|---|---|
| 3,833,383 A | * | 9/1974 | Ryan et al. ..................... 430/1 |
| 4,210,449 A | * | 7/1980 | Schlesinger et al. ............ 430/1 |
| 4,464,221 A | * | 8/1984 | Garber ........................ 156/484 |
| 4,478,932 A | * | 10/1984 | Keane et al. ................ 430/313 |
| 4,502,677 A | * | 3/1985 | Segna et al. ................. 271/104 |
| 4,840,698 A | * | 6/1989 | Kuehnert ..................... 156/485 |
| 4,921,556 A | * | 5/1990 | Hakiel et al. ................ 156/164 |
| 4,942,112 A | * | 7/1990 | Monroe et al. .............. 430/282 |
| 4,950,567 A | * | 8/1990 | Keys et al. ..................... 430/1 |
| 4,953,923 A | * | 9/1990 | Wreede .......................... 430/1 |
| 5,106,450 A | * | 4/1992 | Freisitzer et al. ........... 156/517 |
| 5,269,873 A | * | 12/1993 | Platzer et al. ............... 156/584 |
| 5,328,546 A | * | 7/1994 | Brady et al. ................. 156/584 |
| 5,470,662 A | * | 11/1995 | Weber et al. ................... 430/1 |
| 5,525,457 A | * | 6/1996 | Nemoto et al. ............. 430/325 |
| 5,633,100 A | * | 5/1997 | Mickish et al. ................ 430/1 |
| 5,714,079 A | * | 2/1998 | Mycek et al. ................. 216/35 |
| 5,798,850 A | * | 8/1998 | Ishikawa et al. ............... 430/1 |
| 5,886,102 A | * | 3/1999 | Sinta et al. ............. 430/271.1 |
| 6,285,503 B1 | * | 9/2001 | Chao et al. ..................... 430/2 |

FOREIGN PATENT DOCUMENTS

JP          09-054539        *   2/1997   .................... 430/1

OTHER PUBLICATIONS

The Random House College Dictionary (1973), pp. 711.
machine translation of jp 09-054539.*
English Translation of JP 09-054539.*

* cited by examiner

Primary Examiner—Martin Angebranndt
(74) Attorney, Agent, or Firm—Dellett & Walters

(57) ABSTRACT

The invention relates to a hologram-recording dry plate fabrication process and system that can be used to fabricate a transmission or reflection hologram-recording dry plate particularly best suited for applications where high precision and high cleanliness are required. The hologram-recording dry plate comprises a substrate feeding means for feeding a substrate, a film feeding means for feeding a sheet-cut form of film having a separator, a separator releasing means for releasing the separator from the thus fed film, and a lamination means for laminating the film from which the separator is released on one surface of the thus fed substrate from the side of the film from which the separator is released.

20 Claims, 12 Drawing Sheets

① Light-tight film lamination

② First photosensitive material lamination

③ Second photosensitive material lamination

④ Third photosensitive material lamination

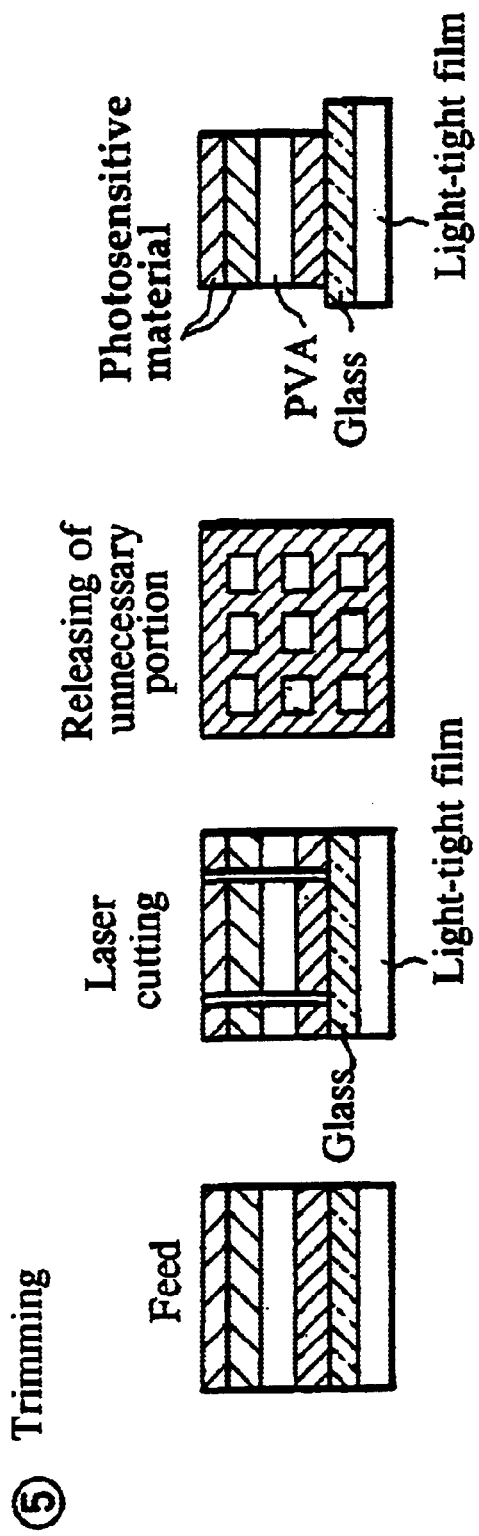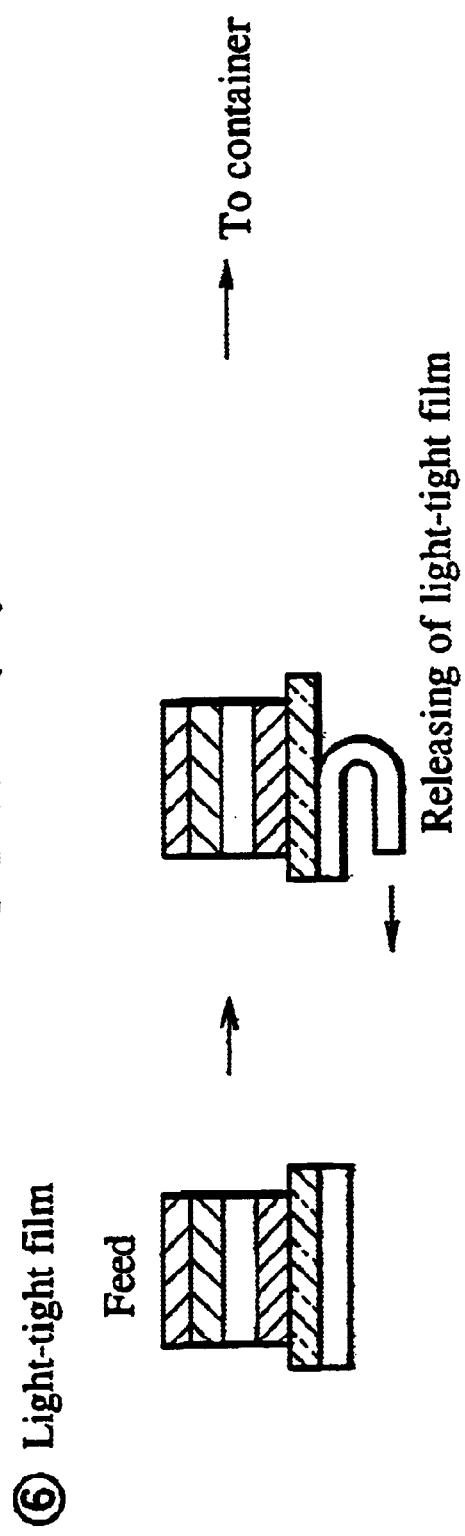

① Colored film lamination

② First photosensitive material lamination

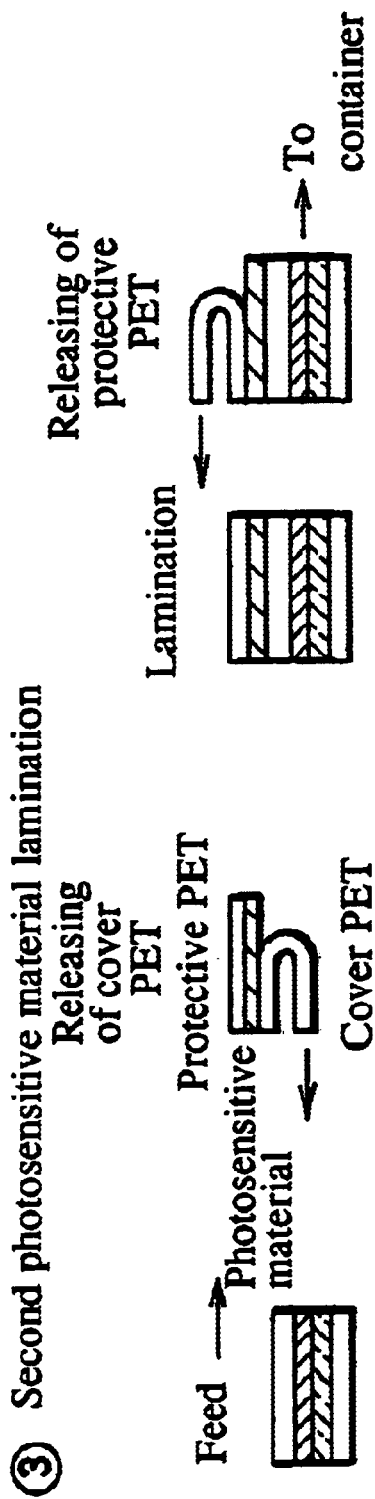
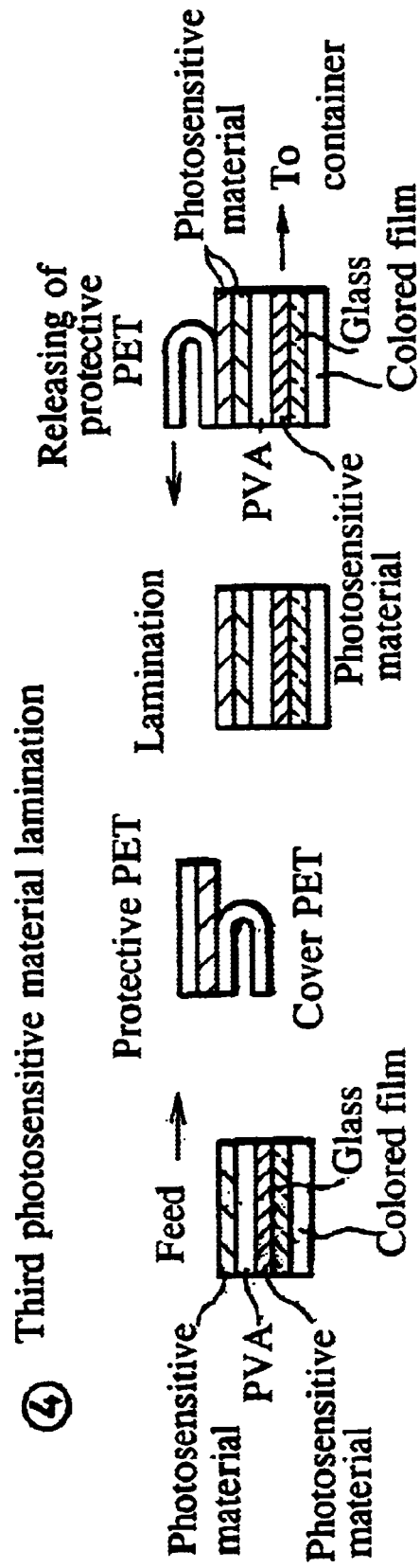

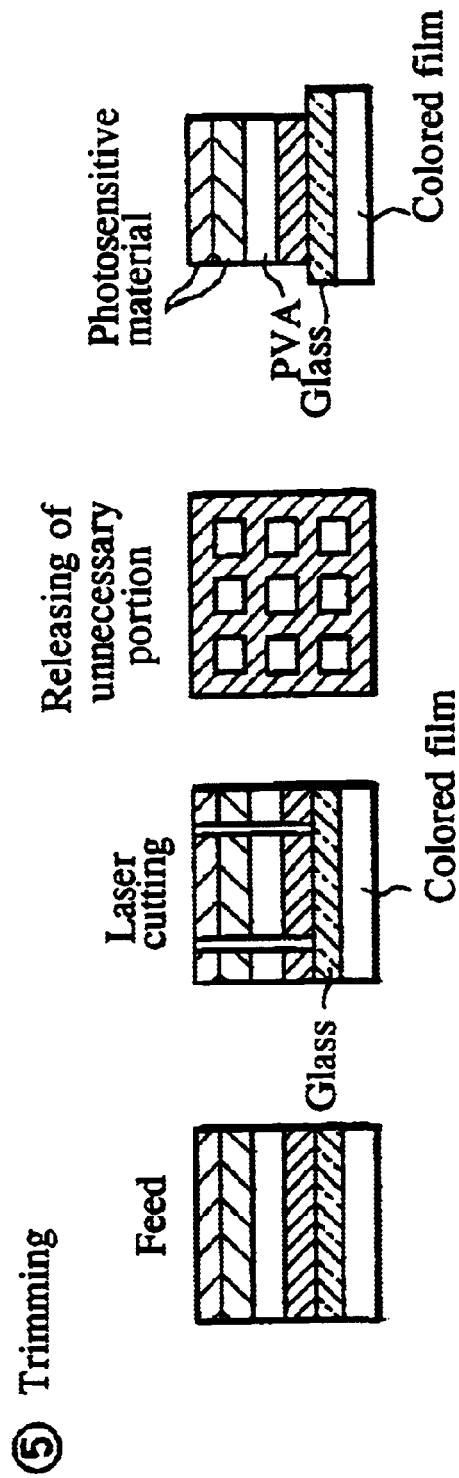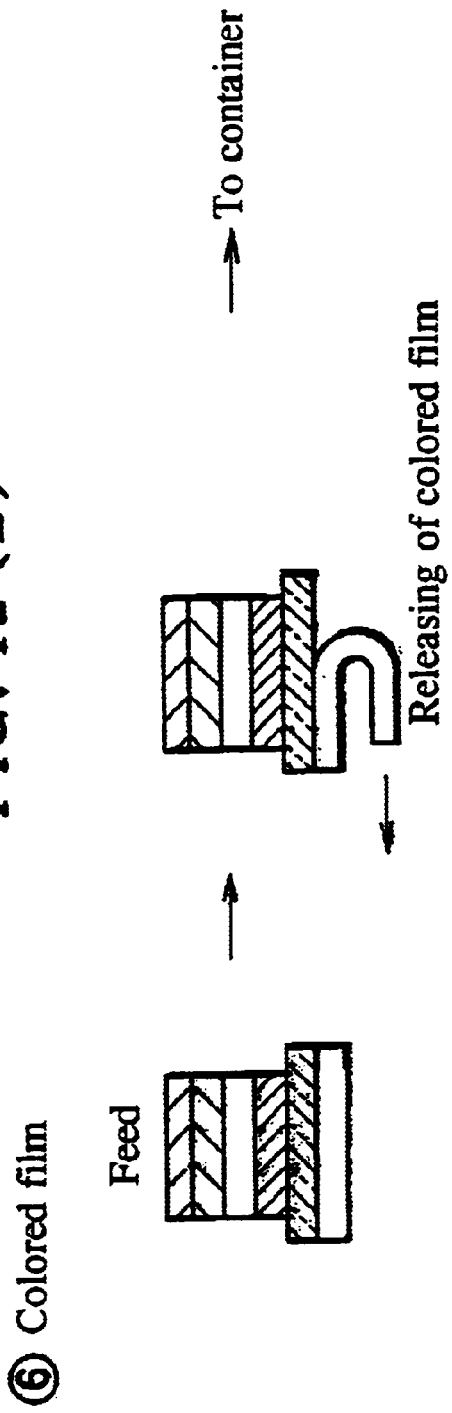

210

230

250

270

PROCESS AND SYSTEM OF MAKING HOLOGRAM-RECORDING DRY PLATES

BACKGROUND OF THE INVENTION

The present invention relates generally to a process and system for making a hologram-recording dry plate. In particular, this invention is directed to a process and system for fabricating a transmission hologram-recording dry plate provided with a layer for preventing halation during recording or reproduction as well as a reflection hologram-recording dry plate provided with a colored layer or an antireflection layer for preventing formation of unnecessary interference fringes by interface reflection at an air/dry plate interface during recording or reproduction.

For the recording or reproduction of a transmission hologram, object light and reference light are entered in a hologram-recording dry plate from its surface side. However, the object light and reference light arriving at the back side of the dry plate is reflected thereat, resulting in halation. As halation occurs, unnecessary interference fringes are recorded in the dry plate and so the reconstruction capability of the hologram becomes worse. For this reason, the transmission hologram-recording dry plate has so far been provided on its back surface with a layer (anti-halation layer) for absorbing transmitted laser light, thereby reducing the occurrence of undesired interference fringes ascribed to the reflection of laser light at the back surface. The anti-halation layer is generally provided on the back surface of the dry plate by the coating and drying of a resin solution with a dye dissolved therein. For instance, an intimate mixture of a suitable amount of dye with a methyl ethyl ketone solution of polyvinyl butyral (PVB) may be used.

However, one problem with this method is that its productivity is low because of comprising a complicated process including the coating and drying of the resin solution, and another problem is contamination of the front surface of the photosensitive material with a portion of the coated solution that comes from the back surface. In applications where high cleanliness is required, additional steps of wiping away the anti-halation layer with a solvent after recording are used, thereby achieving complete removal thereof. As an example, JP-A 9-54539 proposes a transmission hologram-recording dry plate wherein an anti-halation layer is used in a dry film form that enables a conventional fabrication process to be greatly simplified and can fit well for a laminator. This publication also comes up with a fabrication process and system.

For the recording or reproduction of a reflection hologram, reference light is entered in a hologram-recording dry plate from its front surface while object light (diffracted light from a subject or hologram plate) is entered in the hologram-recording dry plate from its back surface. Upon reaching an air/dry plate interface, however, the object or reference light is reflected thereat, resulting in halation. As halation occurs, unnecessary interference fringes are recorded in the dry plate and so the reconstruction capability of the hologram becomes worse. Usually, therefore, an antireflection glass or colored glass (ND (neutral density) glass) for preventing reflection at the interface is provided on the air/dry plate interface of the reflection hologram dry plate.

The antireflection glass is laminated on the interface with an optical contact liquid located between them. However, the optical contact liquid is poor in workability, because it is difficult to have a uniform thickness due to flowing, vibration, air entrapment, etc., and especially because when used in a large amount, long time is needed until it is kept stationary and stabilized after coating. To solve these problems, for instance, JP-A 5-281883 and Japanese Patent Application Nos. 7-281583 and 7-114329 propose a process of fabricating a hologram dry plate without recourse to any contact liquid, wherein a flexible colored or antireflection film is used instead of the glass.

With a conventional transmission hologram-recording dry plate fabrication process and system such as one disclosed in the aforesaid JP-A 9-54539, it is possible to fabricate both a transmission hologram-recording dry plate and a reflection hologram-recording dry plate. When a roll form of film having a separator is intermittently fed, however, it is impossible to prevent film defects caused by the pressure of a guide roller or the like, and the occurrence and deposition of dust caused by sheet-cutting. In applications where high precision and cleanliness are needed, it is thus impossible to achieve a transmission or reflection hologram-recording dry plate that has always sufficient properties.

SUMMARY OF THE INVENTION

An object of the present invention is to solve the aforesaid problems by the provision of a hologram-recording fabrication process and system that can be used to fabricate a transmission or reflection hologram-recording dry plate particularly best suited for applications where high precision and high cleanliness are required.

This object is achieved by the following embodiments. As recited in claim 1, the present invention provides a hologram-recording dry plate fabrication process comprising steps of:

feeding a substrate, feeding a sheet-cut form of hologram-recording photosensitive film comprising a supporting film, a hologram-recording photosensitive material and a separator, releasing said separator from said fed hologram-recording photosensitive film, and laminating said hologram-recording photosensitive film from which said separator is released on one surface of said fed substrate from a hologram-recording photosensitive material side.

According to the invention recited in claim 1, the substrate is fed at the substrate feeding step, the sheet-cut form of hologram-recording photosensitive film comprising a supporting film, a hologram-recording photosensitive material and a separator is fed at the hologram-recording photosensitive film feeding step, the separator is released from the thus fed hologram-recording photosensitive film at the separator-releasing step and the hologram-recording photosensitive film from which the separator is released is laminated from the hologram-recording photosensitive material side onto one surface of the thus fed substrate. That is, since the sheet-cut form of hologram-recording photosensitive film is fed, a roll form of film having a separator is not susceptible to film defects by a guide roller, etc., which are found when it is intermittently fed. In addition, since the fabrication process does not have any sheet-cutting step because of the use of a sheet-cut form of hologram-recording photosensitive film, there is neither generation nor deposition of dust due to sheet-cutting. It is thus possible to provide a hologram-recording drying plate fabrication process that can be used to fabricate a dry plate for recording a transmission or reflection hologram particularly suitable for applications where high precision and high cleanliness are needed.

As recited in claim 2, the present invention provides a hologram-recording dry plate fabrication process according to claim 1, wherein said separator-releasing step and/or said lamination step are carried out while said substrate and/or said hologram-recording photosensitive film are vertically supported. Since the separator-releasing step and/or the lamination step are carried out while the substrate and the hologram-recording photosensitive film are vertically supported according to the invention recited in claim 2, it is less likely that falling dust is deposited on the dry plate. It is thus possible to provide a hologram-recording drying plate fabrication process that can be used to fabricate a dry plate for recording a transmission or reflection hologram particularly suitable for applications where high precision and high cleanliness are needed.

As recited in claim 3, the present invention provides a hologram-recording dry plate fabrication process according to claim 1 or 2, which comprises steps of:

feeding a sheet-cut form of adhesion-added light absorption film comprising a separator, an adhesive layer and a light absorption film or a sheet-cut form of light absorption adhesive film comprising a separator, a light absorption adhesive layer and a supporting film, releasing said separator from said fed adhesion-added light absorption film or said fed light absorption adhesive film, and laminating said adhesion-added light absorption layer or light absorption adhesive film from which said separator is released on one surface of said fed substrate from an adhesive layer or light absorption adhesive layer side.

According to the invention recited in claim 3, since the sheet-cut form of adhesion-added light absorption film or light absorption adhesive film is fed, a roll form of film having a separator is not susceptible to film defects by a guide roller, etc., which are found when it is intermittently fed. In addition, since the fabrication process does not have any sheet-cutting step because of the use of a sheet-cut form of film, there is neither generation nor deposition of dust due to sheet-cutting. It is thus possible to provide a hologram-recording drying plate fabrication process that can be used to fabricate a dry plate for recording a transmission or reflection hologram particularly suitable for applications where high precision and high cleanliness are needed.

As recited in claim 4, the present invention provides a hologram-recording dry plate fabrication process according to claim 3, wherein said separator-releasing step and/or said lamination step are carried out while said substrate and said adhesion-added light absorption film or said light absorption adhesive film are vertically supported.

Since the separator-releasing step and/or the laminating step are carried out while the substrate and said adhesion-added light absorption film or said light absorption adhesive film are vertically supported according to the invention recited in claim 4, it is less likely that falling dust is deposited on the dry plate. It is thus possible to provide a hologram-recording drying plate fabrication process that can be used to fabricate a dry plate for recording a transmission or reflection hologram particularly suitable for applications where high precision and high cleanliness are needed.

As recited in claim 5, the present invention provides a hologram-recording dry plate fabrication process according to claim 1 or 2, which comprises steps of:

feeding a sheet-cut form of an adhesion-added colored film comprising a separator, an adhesive layer and a colored film, a sheet-cut form of colored adhesive film comprising a separator, a colored adhesive layer and a supporting film or a sheet-cut form of an adhesion-added antireflection film comprising a separator, an adhesive layer and an antireflection film, releasing said separator from said fed adhesion-added colored film, said fed colored adhesive film or said fed adhesion-added antireflection film, and laminating said fed adhesion-added, colored film, colored adhesive film or adhesion-added antireflection film from which said separator is released on one surface of said fed substrate from an adhesive layer or colored adhesive layer side.

According to the invention recited in claim 5, since the sheet-cut form of adhesion-added colored film, the sheet-cut form of colored adhesive film or the sheet-cut form of adhesion-added antireflection film is fed, a rolled form of film having a separator is not susceptible to film defects by a guide roller, etc., which are found when it is intermittently fed. In addition, since the fabrication process does not have any sheet-cutting step because of the use of a sheet-cut form of film, there is neither generation nor deposition of dust due to sheet-cutting. It is thus possible to provide a hologram-recording drying plate fabrication process that can be used to fabricate a dry plate for recording a transmission or reflection hologram particularly suitable for applications where high precision and high cleanliness are needed.

As recited in claim 6, the present invention provides a hologram-recording dry plate fabrication process according to claim 5, wherein said separator-releasing step and/or said lamination step are carried out while said substrate and said adhesion-added colored film, said colored adhesive film or said adhesion-added antireflection film are vertically supported.

Since the separator-releasing step and/or the laminating step are carried out while the substrate and said adhesion-added colored film, said colored adhesive film or said adhesion-added antireflection film are vertically supported according to the invention recited in claim 6, it is less likely that falling dust is deposited on the dry plate. It is thus possible to provide a hologram-recording drying plate fabrication process that can be used to fabricate a dry plate for recording a transmission or reflection hologram particularly suitable for applications where high precision and high cleanliness are needed.

As recited in claim 7, the present invention provides a hologram-recording dry plate fabrication process according to any one of claims 1 to 6, wherein said hologram-recording photosensitive material comprises a photopolymer having adhesion.

According to the invention recited in claim 7, it is possible to provide a hologram-recording dry plate fabrication process wherein the hologram-recording photosensitive material comprises a photopolymer having adhesion.

As recited in claim 8, the present invention provides a hologram-recording dry plate fabrication system comprising a substrate feeding means for feeding a substrate, a film feeding means for feeding a sheet-cut form of film having a separator, a separator releasing means for releasing the separator from the fed film, and a lamination means for laminating the film from which the separator is released on one surface of the fed substrate from the side of the film from which the separator is released.

According to this invention, the substrate is fed by the substrate feeding means, the sheet-cut form of film having a separator is fed by the film feeding means, the separator is released from the fed film by the separator releasing means, and the film from which the separator is released is laminated by the lamination means on one surface of the fed substrate from the side of the film from which the separator is released. That is, since the sheet-cut form of film having a separator is fed, a rolled form film having a separator is not susceptible to film defects by the pressure of a guide roller, etc., which are found when it is intermittently fed. In addition, since the fabrication process does not have any sheet-cutting step because of the use of a sheet-cut form of film, there is neither generation nor deposition of dust due to sheet-cutting. It is thus possible to provide a hologram-recording drying plate fabrication system that can be used to fabricate a dry plate for recording a transmission or reflection hologram particularly suitable for applications where high precision and high cleanliness are needed.

As recited in claim 9, the present invention provides a hologram-recording dry plate fabrication system according to claim 8, which further includes a means for supporting the fed substrate vertically and a means for supporting the fed film vertically, so that while the substrate and/or the film are vertically supported, the separator is released from the film by the separator releasing means and the film is laminated on the substrate by the lamination means.

Since, according to this invention, the separator is released from the film and the film is laminated on the substrate while the substrate and the film are vertically supported, it is less likely that falling dust is deposited on the dry plate. It is thus possible to provide a hologram-recording drying plate fabrication process that can be used to fabricate a dry plate for recording a transmission or reflection hologram particularly suitable for applications where high precision and high cleanliness are needed.

As recited in claim 10, the present invention provides a hologram-recording dry plate fabrication system according to claim 8 or 9, wherein the film is any one of a sheet-cut form of hologram-recording photosensitive film comprising a supporting film, a hologram-recording photosensitive material and a separator, a sheet-cut form of adhesion-added light absorption film comprising a separator, an adhesive layer and a light absorption film and a sheet-cut form of light absorption adhesive film comprising a separator, a light absorption adhesive layer and a supporting film.

According to this invention, any one of a sheet-cut form of hologram-recording photosensitive film comprising a supporting film, a hologram-recording photosensitive material and a separator, a sheet-cut form of adhesion-added light absorption film comprising a separator, an adhesive layer and a light absorption film and a sheet-cut form of light absorption adhesive film comprising a separator, a light absorption adhesive layer and a supporting film can be laminated on the substrate.

As recited in claim 11, the present invention provides a hologram-recording dry plate fabrication system according to claim 8 or 9, wherein the film is any one of a sheet-cut form of hologram-recording photosensitive film comprising a supporting film, a hologram-recording photosensitive material and a separator, a sheet-cut form of adhesion-added colored film comprising a separator, an adhesive layer and a colored film, a sheet-cut form of colored adhesive film comprising a separator, a colored adhesive layer and a supporting film or a sheet-cut form of adhesion-added antireflection film comprising a separator, an adhesive layer and an antireflection film.

According to this invention, any one of a sheet-cut form of hologram-recording photosensitive film comprising a supporting film, a hologram-recording photosensitive material and a separator, a sheet-cut form of adhesion-added colored film comprising a separator, an adhesive layer and a colored film, a sheet-cut form of colored adhesive film comprising a separator, a colored adhesive layer and a supporting film or a sheet-cut form of adhesion-added antireflection film comprising a separator, an adhesive layer and an antireflection film can be laminated on the substrate.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 5 is illustrative of the process of the fabricating the transmission hologram-recording dry plate, wherein (A) stands for the step of trimming the dry plate to a given size and (B) the step of releasing the light-tight film from the dry plate.

FIG. 11 is illustrative of the process of fabricating a reflection hologram-recording dry plate according to the invention, wherein (A) stands for the step of laminating a second photosensitive material on the first photosensitive material and (B) the step of laminating a third photosensitive material on the second photosensitive material.

FIG. 12 is illustrative of the process of the fabricating the reflection hologram-recording dry plate, wherein (A) stands for the step of trimming the dry plate to a given size and (B) the step of releasing the light-tight film from the dry plate.

DESCRIPTION OF THE PREFERRED EMBODIMENTS

Figure 1:
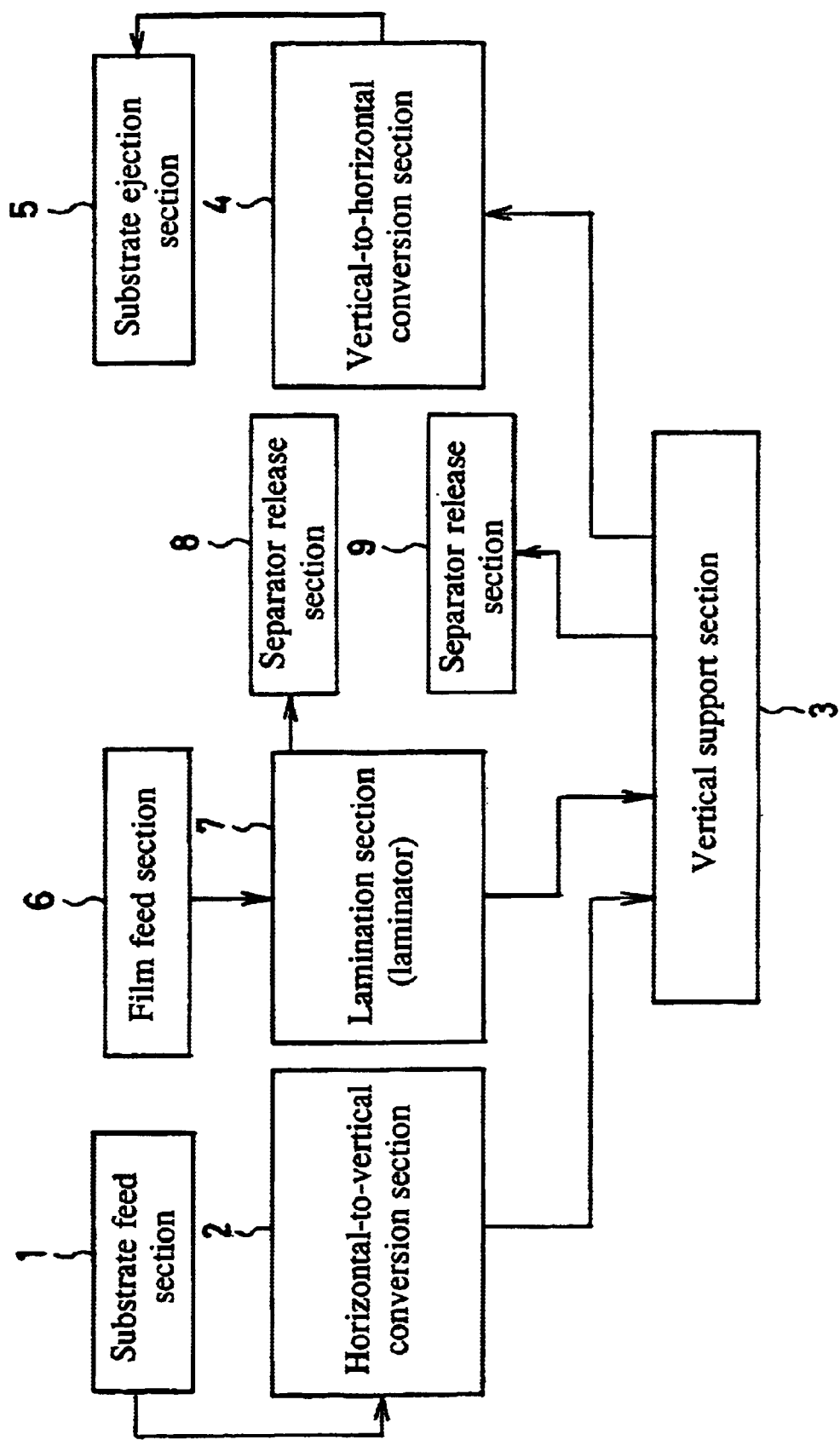
FIG. 1 is a block diagram illustrative of one embodiment of the hologram-recording dry plate fabrication process and system according to the present invention.
Figure 2:
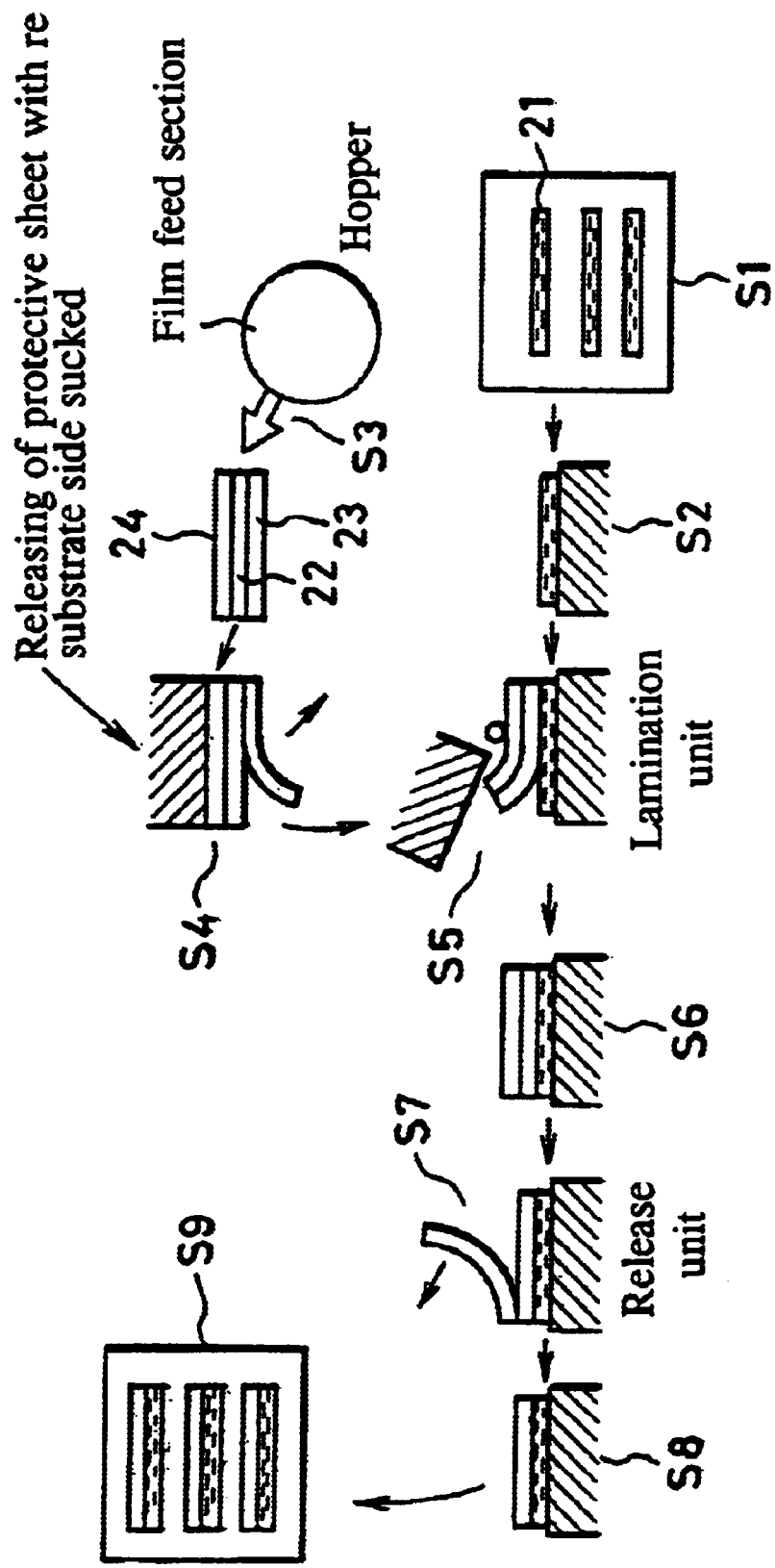
FIG. 2 is illustrative of the sequence of steps for processing the film to be laminated on the substrate.

Several embodiments of the process and system for fabricating a hologram-recording dry plate according to the present invention will now be explained. FIG. 1 is a block diagram illustrative of one embodiment of the process and system for fabricating a hologram-recording dry plate according to the invention. FIG. 2 is illustrative of the sequence of steps for processing the film to be laminated on the substrate. In FIG. 1, reference numeral 1 stands for a substrate feed section, 2 a horizontal-to-vertical conversion section, 3 a vertical support section, 4 a vertical-to-horizontal conversion section, 5 a substrate ejection section, 6 a film feed section, 7 a lamination section (laminator), and 8 and 9 represent separator release sections. In FIG. 2, reference 21 stands for a substrate, 22 a film and 23 and 24 indicate separators.

The present invention is explained with reference to FIGS. 1 and 2. The substrate feed section 1 is provided to feed hologram-recording dry plate substrates to their fabrication system (step S1). The substrates stored in a container are fed one by one from that container. The container is provided to protect the washed substrates from contamination with dust. The hologram-recording dry plate fabrication system is installed in a clean environment. The fabrication system thus shielded from the outside environment also includes equipment for keeping a clearer environment therein. The substrates received in the container may be arranged with their surfaces located in the parallel direction with respect to the vertical direction. In one embodiment of the invention explained herein, however, the substrates are stacked up parallel with the horizontal direction. The substrates stacked up in the container are pushed out of the substrate feed section 1 and fed one by one onto a stage in the fabrication system. To ensure unremitting substrate feeding, one container is followed by another.

The horizontal-to-vertical conversion section 2 is provided to convert the surface of the substrate fed onto the substrate feeding stage in the fabrication system from the direction parallel with the horizontal direction to the direction parallel with the vertical direction. The horizontal-to-vertical conversion section 2 includes a vacuum-puck panel and an arm movable with the vacuum-puck panel held thereon. The vacuum-puck panel includes a plurality of suction pucks for vacuum-attracting the peripheral portion of the substrate onto them. In the horizontal-to-vertical conversion section 2, the arm is so moved that the vacuum-puck panel can be opposite to the substrate fed onto the substrate feeding stage. Upon actuation of a vacuum suction mechanism, the substrate can be vacuum-attracted onto the vacuum-puck panel. In the horizontal-to-vertical conversion section 2, the arm is moved to convert the surface of the substrate from the direction parallel with the horizontal direction to the direction parallel with the vertical direction and oppose the vacuum-puck panel to the vertical supporting stage in the vertical support section 3.

The vertical supporting stage in the vertical support section 3, too, includes a vacuum suction mechanism. Upon actuation of the vacuum suction mechanism, the substrate is attracted by vacuum suction onto the vertical suction stage (Step 2). This vertical supporting stage includes a plurality of vacuum holes for vacuum-sucking the whole portion of a film therein. As the vacuum suction mechanism in the horizontal-to-vertical conversion section 2 is stopped, the substrate is held on the vertical supporting stage in the vertical support section 3 while attracted thereonto by vacuum suction.

The vertical support section 3 includes a vertical supporting stage and a linear moving mechanism for guiding and moving the stage in a linear (horizontal) direction. The substrate, once attracted by vacuum suction onto the vertical supporting stage, is laminated or otherwise processed at a given position, and then moved by means of the linear moving mechanism in a given sequence to the substrate ejection section 5 side while changing position.

Prior to explaining the lamination section 5, an account is given of the substrate delivery path. In the vertical-to-horizontal conversion section 4, the surface of the processed substrate (step S8) attracted by vacuum suction onto the vertical supporting stage in the vertical support section 3 is converted from the direction parallel with the vertical direction to that parallel with the horizontal direction. The vertical-to-horizontal conversion section 4 includes a vacuum-puck panel and an arm for holding and moving the vacuum-puck panel, and has the same construction as the horizontal-to-vertical conversion section 2. In other words, if the horizontal-to-vertical conversion 2 is operated in the reverse order, it can be used as the vertical-to-horizontal conversion section 4. The vacuum-puck panel includes a plurality of vacuum pucks for attracting the peripheral portion of the substrate onto them. In the vertical-to-horizontal conversion section 4, the arm is so moved that the vacuum-puck panel can be opposite to the substrate attracted by vacuum suction onto the vertical supporting stage in the vertical support section 3. After a vacuum suction mechanism for the vacuum-puck panel is actuated to attract the substrate onto the panel by vacuum suction, the vacuum suction mechanism for the vertical supporting stage in the vertical support section 3 is stopped. In the vertical-to-horizontal conversion section 4, the arm is moved to convert the surface of the substrate from the direction parallel with the vertical direction to that parallel with the horizontal direction and oppose the vacuum-puck panel with the substrate attracted onto it by vacuum suction to a substrate ejecting stage in the fabrication system. As the vacuum mechanism for the vacuum-puck panel is stopped, the substrate is carried onto the substrate ejecting stage.

The substrate ejection section 5 is provided to eject and store the processed substrate (that is a hologram-recording dry plate or its intermediary) placed on the substrate ejecting stage in a container (step S9), which is provided to protect the processed substrate from contamination with dust.

The film feed section 6 is provided for the feeding of a sheet-cut film having a separator (releasing paper, releasing film, supporting film) (step S3). In one embodiment of the present invention as shown in FIG. 2, separators 23 and 24 are used on both surfaces of a film 22. Films, received in a container or in the form of a film rolled around a belt in a hopper, are fed out one by one. The container or hopper is provided to protect the films from contamination with dust. The sheet-cut films may be received in the container with their surfaces aligning with the direction parallel with the vertical direction. In the illustrated embodiment, however, the films are received in the container with their surfaces located parallel with the horizontal direction. From the film feed section 5 with films received therein, the films are fed one by one onto a film feeding stage in the fabrication system. On the film feeding stage film alignment is carried out by means of a vertical alignment mechanism and a horizontal alignment mechanism.

In the lamination section 7, a film from which the separators are removed is laminated on one surface of the substrate fed from the substrate feed section 1 and held on the vertical supporting stage in the vertical support section 3. The lamination section 7 includes a vacuum-puck panel, a mechanism for changing the direction (angle) of the vacuum-puck panel and a mechanism for displacing the vacuum-puck panel vertically and horizontally. The vacuum-puck panel includes a plurality of vacuum holes for vacuum-sucking the whole portion of the film therein. Prior to laminating the film on the substrate in the lamination section (laminator) 7, there is a step of releasing the separators from the film. After the film is aligned with and held on the film feeding stage, the film is attracted by vacuum suction onto the vacuum-puck panel in the lamination section 7. Then, the surface of the film is converted from the direction parallel with the horizontal direction to that parallel with the vertical direction. Subsequently, the vacuum-puck panel is moved to a position where the separators are removed from the film.

In the separator release section 8, the separator is released from the film at the releasing position (step S4). In the separator release section 8, a vacuum puck or pressure-sensitive adhesive is applied on a corner portion of a separator at a corner of the film with the separator laminated thereon to peel off the film partially. Thereafter, the vacuum puck is moved over the film to release off the whole of the film while the film is subjected to vacuum suction. As a matter of course, the film is then held on the vacuum-puck panel in the lamination section 7 while the pressure-sensitive, adhesive surface is exposed.

In the lamination section 7, the vacuum-puck panel is displaced to carry the film to a lamination position. At this lamination position, the film on the vacuum-puck panel is opposite to the substrate supported by the vertical support section 3. The film on the vacuum-puck panel is positioned at an angle so oblique that the upper portion of the film is proximate to the substrate and the lower portion is spaced away from the substrate. As the vacuum-puck panel comes close to the substrate at that angle, the upper portion of the film is laminated on the substrate upon coming into contact therewith. In this state, the vacuum-puck panel moves downwardly. The adsorption force between the vacuum-puck panel and the film is smaller than that between the film and the substrate; there is a slip between the vacuum-puck panel and the film, which slip in turn enables the film to be captured by and bonded to the substrate. Above the vacuum-puck panel there is provided a pressure roller. In association with the downward movement of the vacuum-puck panel, the pressure roller moves downwardly while the film and the substrate are compressed together, thereby ensuring more tight bonding (step S5). After the completion of lamination, the vacuum-puck panel goes back to the standby position where the lamination section 7 is on standby.

After the completion of lamination, the outside surface of the film is defined by the separator (step S6). In the separator release section 9, the separator is released from the film (step S7). The operation of the separator release section 9 is basically the same as that of the separator release section 8, and so the detailed explanation thereof is omitted. The substrate from which the separator has been released is delivered to the substrate ejection section 5 while it is vacuum-attracted onto the stage having a vacuum suction mechanism (step S8), as already explained. In the substrate ejection section 5, the substrate is received in the container (step S9).

As can be understood from the foregoing explanations, the sheet-cut form of film is fed in the hologram-recording dry plate fabrication process and system. It is thus possible to prevent the occurrence of film defects due to the guide roller, etc., when the rolled form of film having separators is intermittently fed. In addition, since the fabrication process does not have any sheet-cutting step because of the use of a sheet-cut form of film, there is neither generation nor deposition of dust due to sheet-cutting. Moreover, since the separator releasing step and/or the laminating step are carried out while the substrate and the hologram photosensitive material are vertically supported according to the invention recited in claim 4, it is less unlikely that falling dust is deposited on the dry plate. It is thus possible to fabricate a hologram-recording dry plate particularly suitable for applications where high precision and high cleanliness are needed.

Here an account is given of films used with the hologram-recording dry plate fabrication process and system according to the present invention. First of all, the film used for a transmission hologram-recording dry plate is explained. For instance, this film may be any one of a hologram-recording photosensitive film, an adhesion-added light absorption film and a light absorption adhesive film. Detailed constructions of these films will be explained later. With the aforesaid fabrication process and system, the transmission hologram-recording dry plate can be fabricated by laminating the hologram-recording photosensitive film on one surface of a substrate at the first step and then laminating the adhesion-added light absorption film or light absorption adhesive film on the opposite surface of the substrate at the second step.

Here a set of vertical support section 3, film feed section 6, lamination section 7 and separator release sections 8 and 9 shown in FIG. 1 is referred to as one unit. By increasing the distance of the vertical support section 3, two such units can be provided. If a surface interchange portion for interchanging the outer and inner surfaces of a substrate vertically supported in the vertical support section 3 is located between the units, it is then possible to fabricate a transmission hologram-recording dry plate in one single operation. Thus, if additional units are provided at need, the necessary number of films can then be laminated on the substrate.

Figure 3:
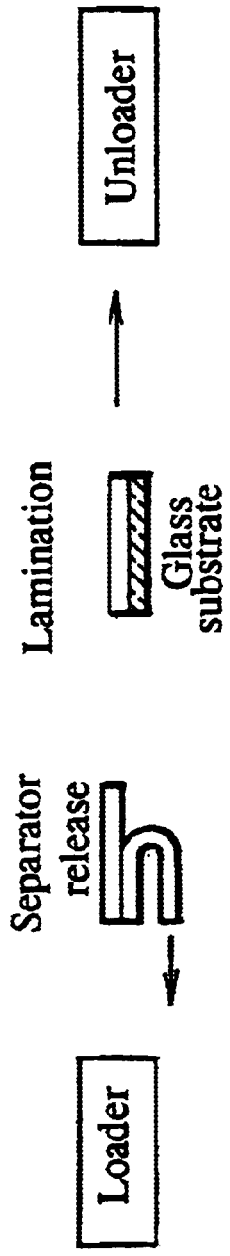
FIG. 3 is illustrative of the process of fabricating a transmission hologram-recording dry plate according to the invention, wherein (A) stands for the step of laminating a light-tight film on a substrate and (B) the step of laminating a first photosensitive material on the substrate.
Figure 3:
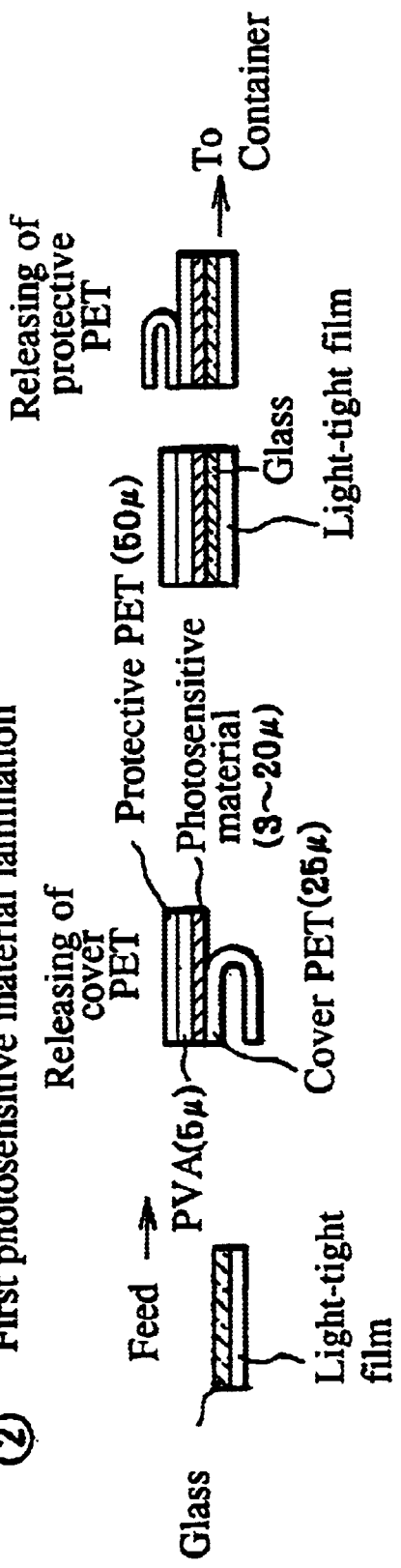

Next, an account is given of the transmission hologram-recording dry plate fabrication process according to the invention that is carried out with the inventive fabrication system. The transmission hologram-recording dry plate fabrication process comprises steps of (1) laminating a light-tight film on one surface of a substrate, (2) laminating a first photosensitive material on the opposite surface of the substrate, (3) laminating a second photosensitive material on the first photosensitive material, and (4) laminating a third photosensitive material on the second photosensitive material. FIG. 3(A) shows the step (1) of laminating the light-tight film on the substrate, FIG. 3(B) the step (2) of laminating the first photosensitive material on the substrate, FIG. 4(A) the step (3) of laminating the second photosensitive material on the first photosensitive material, and FIG. 4(B) the step (4) of laminating the third photosensitive material on the second photosensitive material.

At the light-tight film lamination step (1), a sheet-cut form of light-tight film having a separator is fed out of a film feed section (loader) 6, as shown in FIG. 3(A). Then, the separator is released from the light-tight film. Then, a glass substrate is fed out of the glass feed section 1 so that the light-tight film is laminated on its surface side from which the separator is released on the substrate. Finally, the glass substrate with the light-tight film laminated thereon is delivered to the substrate ejection section 5 where it is received in the container.

At the first photosensitive material lamination step (2), the glass substrate with the light-tight film laminated thereon is fed out of the substrate feed section 1, as shown in FIG. 3(B). On the other hand, a sheet-cut form of first photosensitive material having separators is fed out of the film feed section (loader) 6. Then, the inside separator is released from the first photosensitive material. Then, the first photosensitive material is laminated on its surface side from which the separator is released on the surface of the glass substrate facing away the light-tight film. Then, the outside separator (protective PET) is released from the first photosensitive material. Finally, the glass substrate with the light-tight film and first photosensitive material laminated thereon is delivered to the substrate ejection section 5 where it is received in the container.

Figure 4:
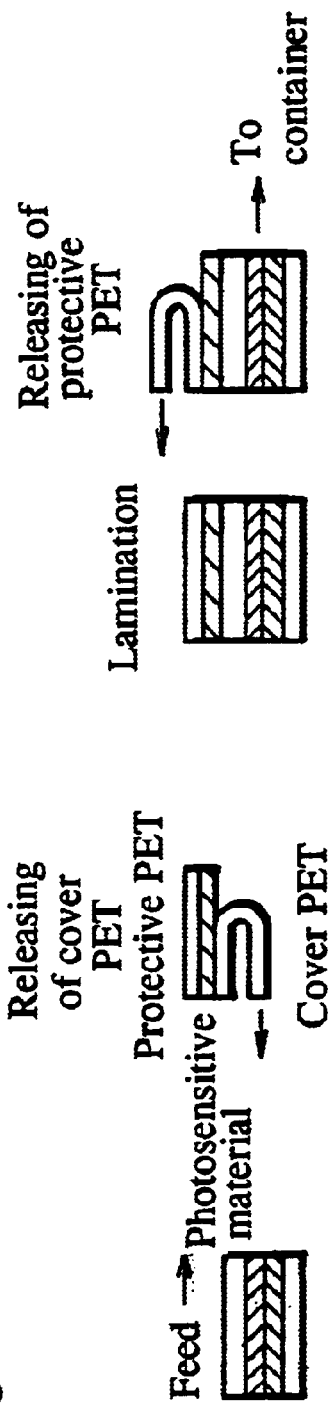
FIG. 4 is illustrative of the process of fabricating the transmission hologram-recording dry plate according to the invention, wherein (A) stands for the step of laminating a second photosensitive material on the first photosensitive material and (B) the step of laminating a third photosensitive material on the second photosensitive material.
Figure 4:
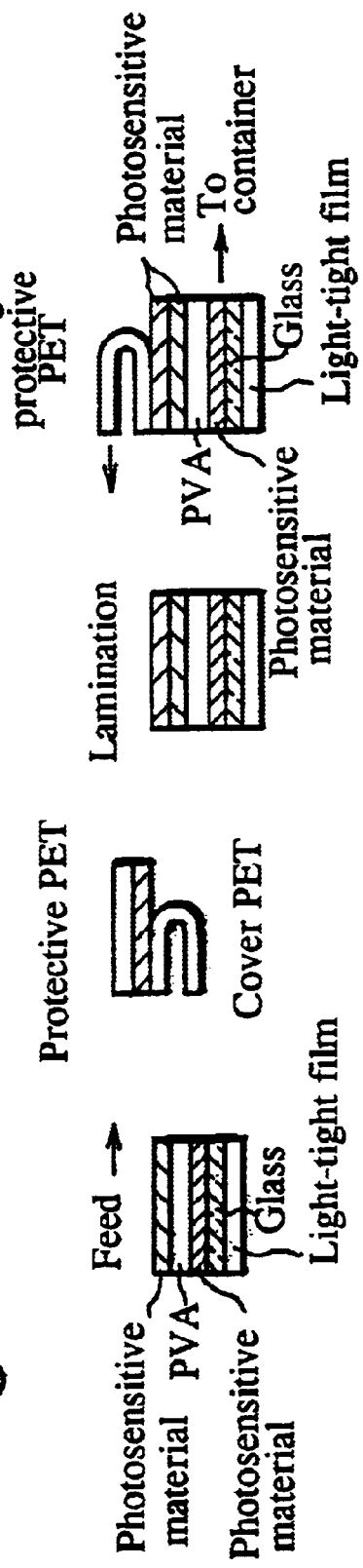

At the second photosensitive material lamination step (3), the glass substrate with the light-tight film and first photosensitive material laminated thereon is fed out of the substrate feed section 1, as shown in FIG. 4(A). On the other hand, a sheet-cut form of second photosensitive material having separators is fed out of the film feed section (loader) 6. Then, the inside separator is released from the second photosensitive material. Then, the second photosensitive material is laminated on its surface side from which the separator is released on the surface of the first photosensitive material. Then, the outside separator (protective PET) is released from the second photosensitive material. Finally, the glass substrate with the light-tight film and first and second photosensitive materials laminated thereon is delivered to the substrate ejection section 5 where it is received in the container.

At the third photosensitive material lamination step (4), the glass substrate with the light-tight film and first and second photosensitive materials laminated thereon is fed out of the substrate feed section 1, as shown in FIG. 4(B). On the other hand, a sheet-cut form of third photosensitive material having separators is fed out of the film feed section (loader) 6. Then, the inside separator is released from the third photosensitive material. Then, the second photosensitive material is laminated on its surface side from which the separator is released on the surface of the second photosensitive material. Then, the outside separator (protective PET) is released from the third photosensitive material. Finally, the glass substrate with the light-tight film and first, second and third photosensitive materials laminated thereon is delivered to the substrate ejection section 5 where it is received in the container.

Through the aforesaid steps (1) to (4), the transmission hologram-recording dry plate can be obtained. Next, a part of the step of processing the transmission hologram-recording dry plate in the process of obtaining a transmission hologram from the transmission hologram-recording dry plate is explained. This step comprises (5) trimming the dry plate to a given size and (6) releasing the light-tight film from the dry plate. Trimming the dry plate to the given size is shown in FIG. 5(A) and releasing the light-tight film from the dry plate is illustrated in FIG. 5(B).

At the step (5) of trimming the dry plate to the given size, the glass substrate with the first, second and third photosensitive materials laminated thereon is fed out of the substrate feed section, as shown in FIG. 5(A). Then, the film layer of multilayer construction formed on the glass substrate is cut at a given position, using a laser cutter. Finally, a film layer portion unnecessary for a transmission hologram is released and removed. One exemplary construction of the transmission hologram-recording dry plate that is trimmed to the given size is shown on the right side of FIG. 5(A).

At the light-tight film release step (6), on the other hand, the trimmed transmission hologram-recording dry plate or transmission hologram is fed out of the substrate feed section, as shown in FIG. 5(B). Then, the light-tight film is released from the glass substrate. Finally, the transmission-hologram recording dry plate or transmission hologram, from which the light-tight film is released, is delivered to the substrate ejection section where it is received in the container.

Figure 6:
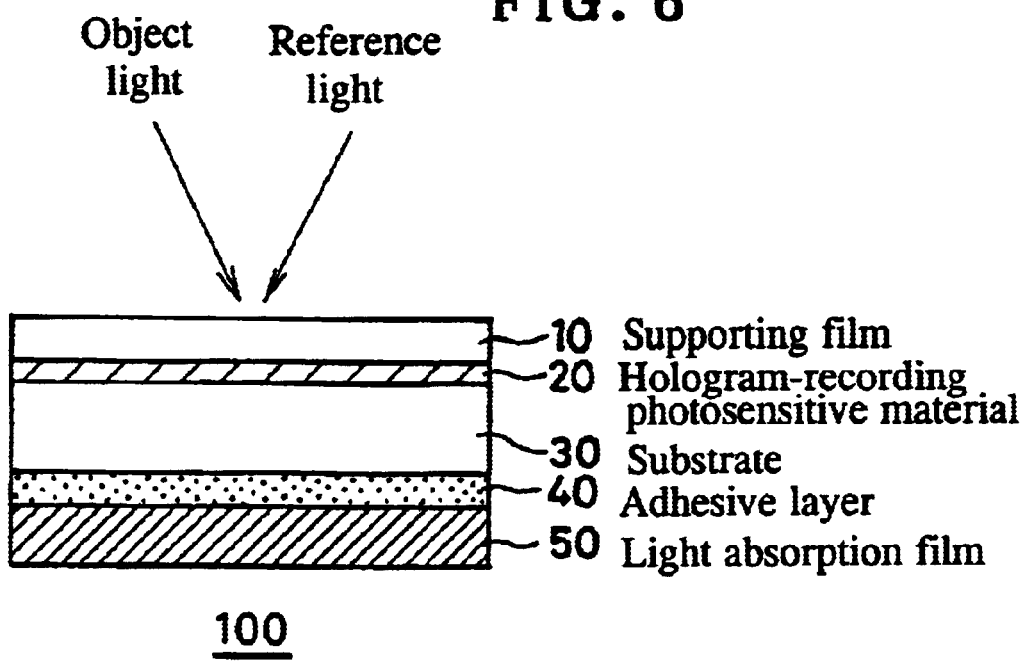
FIG. 6 is illustrative of the layer construction of one embodiment of the transmission hologram-recording dry plate according to the invention.
Figure 7:
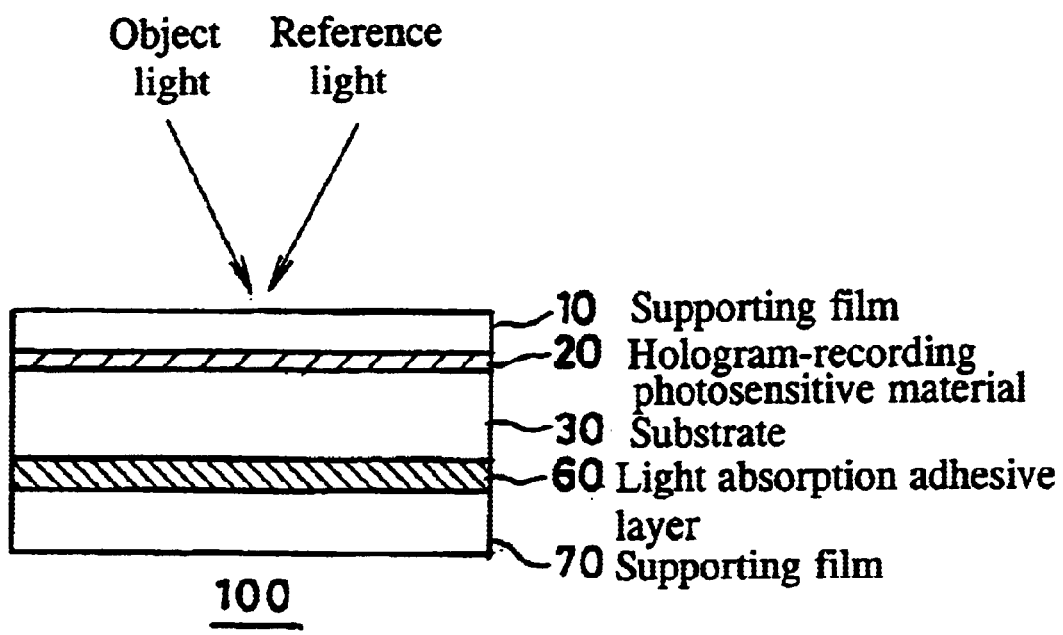
FIG. 7 is illustrative of the layer construction of another embodiment of the transmission hologram-recording dry plate according to the invention.

Here an account is given of the transmission hologram-recording dry plate fabricated by the inventive fabrication process and system as well as the materials that form it. Two exemplary layer constructions of a transmission hologram-recording dry plate 100 are shown in FIGS. 6 and 7. In FIG. 6, the dry plate 100 comprises, from the incidence side of object light and reference light, a supporting film 10, a hologram-recording photosensitive material 20, a substrate 30, an adhesive layer 40 and a light absorption film 50. In FIG. 7, the dry plate 100 comprises, from the incidence side of object light and reference light, a supporting film 10, a hologram-recording photosensitive material 20, a substrate 30, a light absorption adhesive layer 60 and a supporting film 70. It is here noted that for actual recording or reproduction, the supporting film 10 may be released and removed from the surface of the hologram-recording photosensitive material 20 in the transmission hologram-recording dry plate 100.

Figure 8:
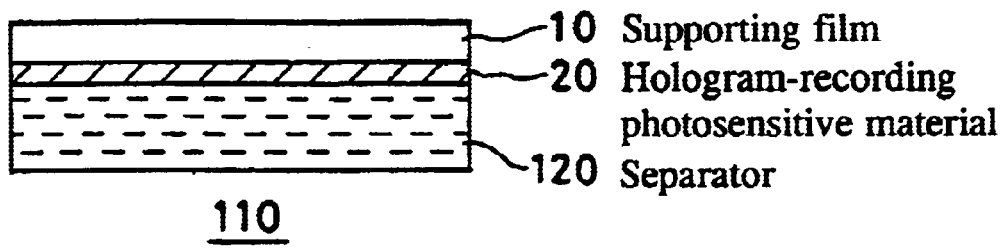
FIG. 8 is illustrative of the layer construction of a hologram-recording photosensitive film used for the fabrication of the transmission hologram-recording dry plate according to the invention.
Figure 9:
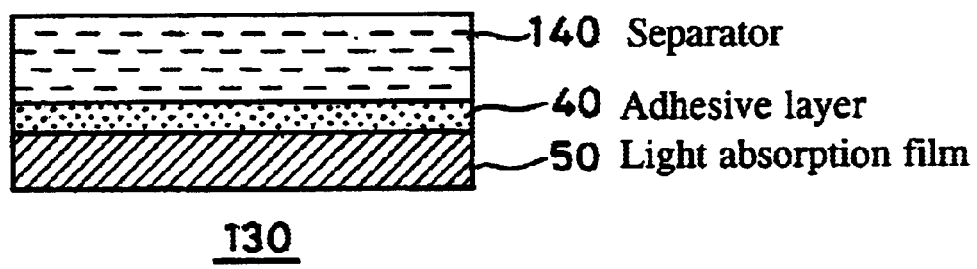
FIG. 9 is illustrative of the layer constructions of an adhesion-added light absorption film and a light absorption adhesive film used for the fabrication of the transmission hologram-recording dry plate according to the invention.
Figure 9:
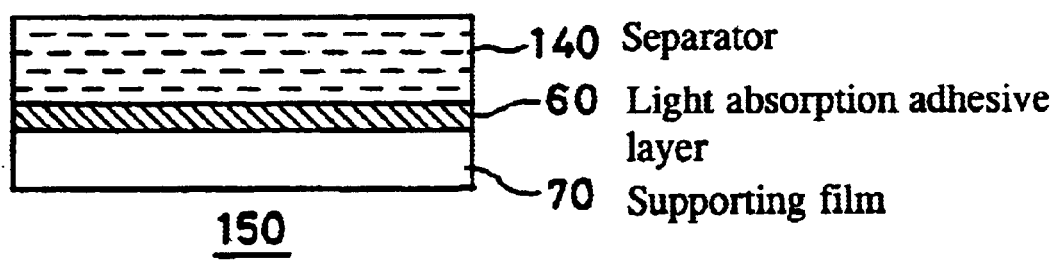

A hologram-recording photosensitive film 110 herein used to fabricate the transmission hologram-recording dry plate 100 of such layer construction as shown in FIG. 6 or 7 comprises a supporting film 10, a hologram-recording photosensitive material 20 and a separator (release film) 120, as can be seen from the layer construction of FIG. 8. A film for adding light absorption to the back surface of the transmission hologram-recording dry plate 100 is an adhesion-added light absorption film comprising a separator (release film) 140, an adhesive layer 40 and a light absorption film 50 as shown in FIG. 9(a), or a light absorption adhesive film 150 comprising a separator (release film) 140, a light absorption adhesive layer 60 and a supporting film 70 as shown in FIG. 9(b).

For a hologram-recording photosensitive material 20 in a hologram-recording photosensitive film 110 shown in FIG. 8, a photopolymer material having adhesion should preferably be used as a substrate 30. Of course, it is acceptable to use other photosensitive materials such as silver salts and bichromated gelatin. For selective release, as a matter of course, the release strengths between the supporting film 10 and the hologram-recording photosensitive material 20 and between the hologram-recording photosensitive material 20 and the separator 120 should conform to the following relation:

[supporting film 10/hologram-recording photosensitive material 20]≧[hologram-recording photosensitive material 20/separator 120]

For the supporting film 10 it is preferable to use PET film (of optical grade in particular), triacetyl cellulose film, polypropylene film, polyethylene film, polyvinyl chloride film, acrylic film, polyvinyl alcohol film and polyethylene vinyl alcohol copolymer film, all obtained by extrusion.

For the separator 120 such similar films as mentioned for the supporting film 10 may be used. However, it is preferable to use a film different in release properties from that supporting film 10. For the photopolymer photosensitive material used as the hologram-recording photosensitive material 20, for instance, Du Pont's photopolymers commercially available under the trade name of Omnidex may be used.

For the substrate 30, a variety of transparent rigid materials may be used; for instance, various glass substrates, polycarbonate substrates and acrylic substrates may be used. If necessary, it is preferable to subject the substrate to suitable primer treatments because some improvements in adhesion are obtainable. For instance, the glass substrates may be coated and dried with various silane coupling agents, acrylic adhesives, polyurethane adhesives, etc. The substrate 30 may be used in a dry film form.

An adhesion-added light absorption film 130 shown in FIG. 9(a) is kept stable all the time during hologram recording. However, the light absorption film 130 must be removed without any remnants after recording. For selective release, the release strengths between the light absorption film 50 and the adhesive layer 40 and between the adhesive layer 40 and the separator 140 should satisfy the following relation:

[light absorption film 50/adhesive layer 40]≧[adhesive layer 40/separator 140]

For the light absorption film 50 it is preferable to use PET film (of optical grade in particular), triacetyl cellulose film, polypropylene film, polyethylene film, polyvinyl chloride film, acrylic film, polyvinyl alcohol film and polyethylene vinyl alcohol copolymer film, all obtained by extrusion and colored. Colored films are generally broken down into a film with pigments, dyes, etc. incorporated therein, a film dyed with a dye, a film coated with a pigment-containing resin, and a film coated with a dye-containing resin. It is noted, however, that pigments are unsuitable because they scatter laser light. It is therefore preferable to use dyes. The light absorption film 50 should preferably have an optical concentration of at least 2 at the wavelength of recording laser light.

For the separator 140 such similar films as mentioned for the supporting film 10 may be used. However, it is preferable to use a film different in release properties from that supporting film 10. For the adhesives in the adhesive layer 40, for instance, use may be made of those based on rubber systems such as natural rubber, styrene-butadiene, polyisobutylene, isoprene, natural rubber latex and styrene-butadiene latex; acrylic systems such as acrylic and acrylic emulsion; silicone systems such as silicon; and hot-melt systems such as styrene-isoprene block copolymer, styrene-butadiene block copolymer, styrene-ethylene-butylene block copolymer and ethylene-vinyl acetate copolymer. Preferably, the adhesive in the adhesive layer 40 should have adhesion power decreasing by post-treatments such as heating and ultraviolet irradiation after hologram exposure, and enable the light absorption film to be easily removed from a substrate 30 without any remnants.

A light absorption adhesive film 150 shown in FIG. 9(b) is kept stable all the time during hologram recording. However, the light absorption film 150 must be removed without any remnants after recording. For selective release, the release strengths between the supporting film 70 and the light absorption adhesive layer 60 and between the light absorption adhesive layer 60 and the separator 140 should satisfy the following relation:

[supporting film 70/light absorption adhesive layer 60]≧[light absorption adhesive layer 60/separator 140]

For the supporting film 70 it is preferable to use PET film (of optical grade in particular), triacetyl cellulose film, polypropylene film, polyethylene film, polyvinyl chloride film, acrylic film, polyvinyl alcohol film and polyethylene vinyl alcohol copolymer film, all obtained by extrusion.

For the separator 140 such similar films as mentioned for the supporting film 70 may be used. However, it is preferable to use a film different in release properties from that supporting film 70. For the adhesives in the adhesive layer 60, for instance, use may be made of colored adhesives based on rubber systems such as natural rubber, styrene-butadiene, polyisobutylene, isoprene, natural rubber latex and styrene-butadiene latex; acrylic systems such as acrylic and acrylic emulsion; silicone systems such as silicon; and hot-melt systems such as styrene-isoprene block copolymer, styrene-butadiene block copolymer, styrene-ethylene-butylene block copolymer and ethylene-vinyl acetate copolymer. The adhesive may generally be colored by milling it with pigments, dyes or the like, or dyeing it with a dye. It is noted, however, that pigments are unsuitable because they scatter laser light. It is therefore preferable to use dyes. The light absorption adhesive film 60 should preferably have an optical concentration of at least 2 at the wavelength of recording laser light. Preferably, the adhesive in the light absorption adhesive layer 60 should also have adhesion power decreasing by post-treatments such as heating and ultraviolet irradiation after hologram exposure, and enable the light absorption film to be easily removed together with the supporting film 70 from the substrate 30 without any remnants.

To prevent unnecessary reflection at interfaces during recording, the indices of refraction of the substrate 30, adhesive layer 40, light absorption film 50 and light absorption adhesive layer 60 shown in FIGS. 6 and 7 should preferably be substantially equal to that of the hologram-recording photosensitive material 20. In other words, the preferable refractive index difference should be up to 0.1.

In the foregoing, the transmission hologram-recording dry plate has been explained while the film used is limited to the adhesion-added light absorption film or light absorption adhesive film. However, it is understood that the same effect on prevention of halation is obtainable even when an antireflection film is used instead of these films.

Next, the present invention is explained with reference to the hologram-recording dry plate designed for a reflection hologram. The film used herein, for instance, may be any one of a hologram-recording photosensitive film, an adhesion-added, colored film, a colored adhesive film and an adhesion-added antireflection film. Detailed constructions of these films will be explained later. With the aforesaid fabrication process and system, the reflection hologram-recording dry plate can be fabricated by laminating the hologram-recording photosensitive film on one surface of a substrate at the first step and then laminating the adhesion-added, colored film, colored adhesive film or adhesion-added antireflection film on the opposite surface of the substrate at the second step.

Here a set of vertical support section 3, film feed section 6, lamination section 7 and separator release sections 8 and 9 shown in FIG. 1 is referred to as one unit. By increasing the distance of the vertical support section 3, two such units can be provided. If a surface interchange portion for interchanging the outer and inner surfaces of a substrate vertically supported in the vertical support section 3 is located between the units, it is then possible to fabricate a reflection hologram-recording dry plate in one single operation. Thus, if additional units are provided at need, the necessary number of films can then be laminated on the substrate.

Figure 10:
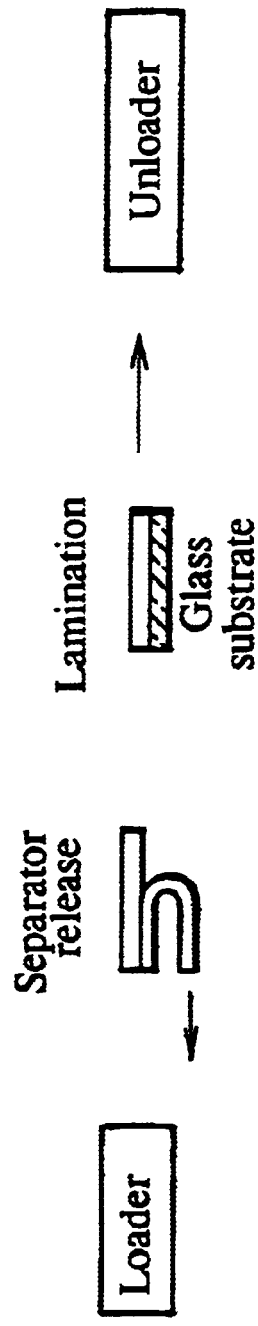
FIG. 10 is illustrative of the process of fabricating a reflection hologram-recording dry plate according to the invention, wherein (A) stands for the step of laminating a light-tight film on a substrate and (B) the step of laminating a first photosensitive material on the substrate.
Figure 10:
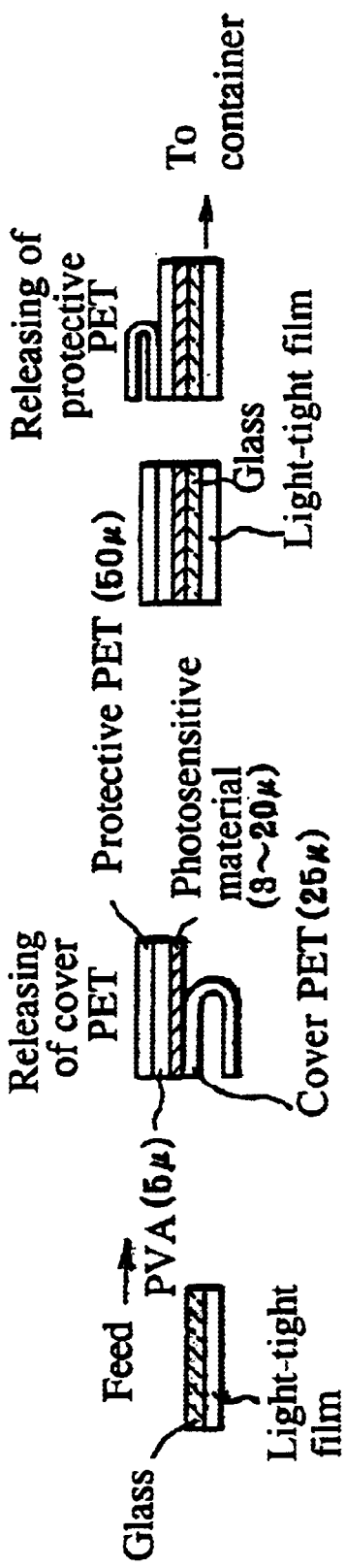

Next, an account is given of the reflection hologram-recording dry plate fabrication process according to the invention that is carried out with the inventive fabrication system. The reflection hologram-recording dry plate fabrication process comprises steps of (1) laminating a colored film on one surface of a substrate, (2) laminating a first photosensitive material on the opposite surface of the substrate, (3) laminating a second photosensitive material on the first photosensitive material, and (4) laminating a third photosensitive material on the second photosensitive material. FIG. 10(A) shows the step (1) of laminating the colored film on the substrate, FIG. 10(B) the step (2) of laminating the first photosensitive material on the substrate, FIG. 11(A) the step (3) of laminating the second photosensitive material on the first photosensitive material, and FIG. 11(B) the step (4) of laminating the third photosensitive material on the second photosensitive material.

At the colored film lamination step (1), a sheet-cut form of colored film having a separator is fed out of a film feed section (loader) 6, as shown in FIG. 10(A). Then, the separator is released from the colored film. Then, a glass substrate is fed out of a glass feed section 1 so that the colored film is laminated on the surface side from which the separator is released on the substrate. Finally, the glass substrate with the colored film laminated thereon is delivered to a substrate ejection section 5 wherein it is received in a container.

At the first photosensitive material lamination step (2), the glass substrate with the colored film laminated thereon is fed out of the substrate feed section 1, as shown in FIG. 10(B). On the other hand, a sheet-cut form of first photosensitive material having separators is fed out of the film feed section (loader) 6. Then, the inside separator is released from the first photosensitive material. Then, the first photosensitive material is laminated on its surface side from which the separator is released on the surface of the glass substrate facing away the colored film. Then, the outside separator (protective PET) is released from the first photosensitive material. Finally, the glass substrate with the colored film and first photosensitive material laminated thereon is delivered to the substrate ejection section 5 where it is received in the container.

At the second photosensitive material lamination step (3), the glass substrate with the colored film and first photosensitive material laminated thereon is fed out of the substrate feed section 1, as shown in FIG. 11(A). On the other hand, a sheet-cut form of second photosensitive material having separators is fed out of the film feed section (loader) 6. Then, the inside separator is released from the second photosensitive material. Then, the second photosensitive material is laminated on its surface side from which the separator is released on the surface of the first photosensitive material. Then, the outside separator (protective PET) is released from the second photosensitive material. Finally, the glass substrate with the colored film and first and second photosensitive materials laminated thereon is delivered to the substrate ejection section 5 where it is received in the container.

At the third photosensitive material lamination step (4), the glass substrate with the colored film and first and second photosensitive materials laminated thereon is fed out of the substrate feed section 1, as shown in FIG. 11(B). On the other hand, a sheet-cut form of third photosensitive material having separators is fed out of the film feed section (loader) 6. Then, the inside separator is released from the third photosensitive material. Then, the second photosensitive material is laminated on its surface side from which the separator is released on the surface of the second photosensitive material. Then, the outside separator (protective PET) is released from the third photosensitive material. Finally, the glass substrate with the colored film and first, second and third photosensitive materials laminated thereon is delivered to the substrate ejection section 5 where it is received in the container.

Through the aforesaid steps (1) to (4), the reflection hologram-recording dry plate can be obtained. Next, a part of the step of processing the reflection hologram-recording dry plate in the process of obtaining a reflection hologram from the reflection hologram-recording dry plate is explained. This step comprises (5) trimming the dry plate to a given size and (6) releasing the colored film from the dry plate. Trimming the dry plate to a given size is shown in FIG. 12(A) and releasing the light-tight film from the dry plate is illustrated in FIG. 12(B).

At the step (5) of trimming the dry plate to the given size, the glass substrate with the first, second and third photosensitive materials laminated thereon is fed out of the substrate feed section, as shown in FIG. 12(A). Then, the film layer of multilayer construction formed on the glass substrate is cut at a given position, using a laser cutter. Finally, a film layer portion unnecessary for a reflection hologram is released and removed. One exemplary construction of the reflection hologram-recording dry plate that is trimmed to the given size is shown on the right side of FIG. 12(A).

At the colored film release step (6), on the other hand, the trimmed reflection hologram-recording dry plate or reflection hologram is fed out of the substrate feed section, as shown in FIG. 12(B). Then, the colored film is released from the glass substrate. Finally, the reflection-hologram recording dry plate or reflection hologram, from which the colored film is released, is delivered to the substrate ejection section where it is received in the container.

Figure 13:
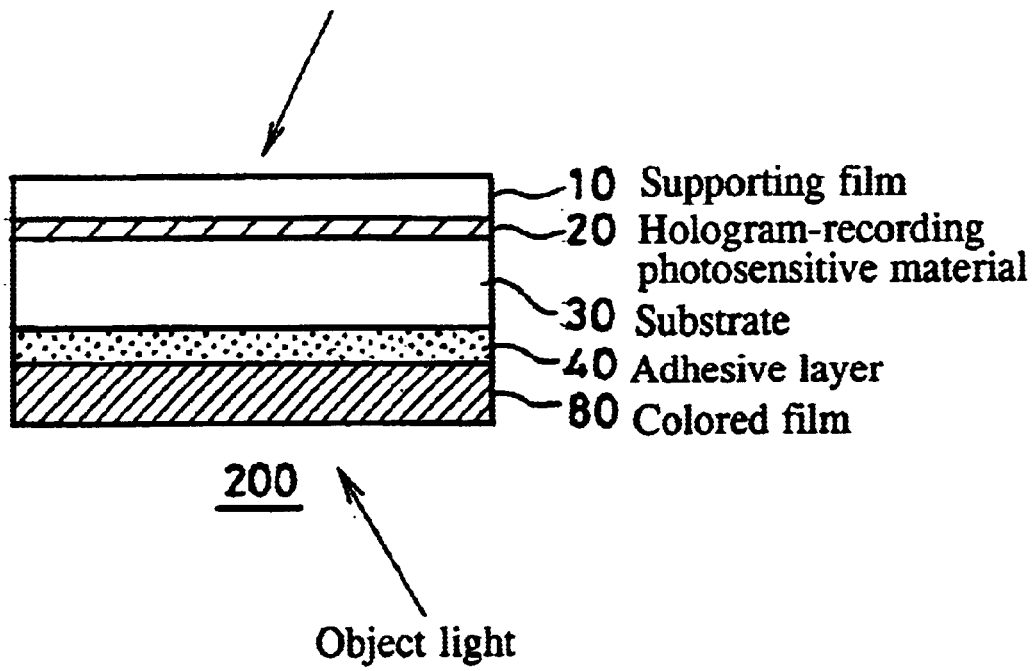
FIG. 13 is illustrative of the layer construction of one embodiment of the reflection hologram-recording dry plate according to the invention.
Figure 14:
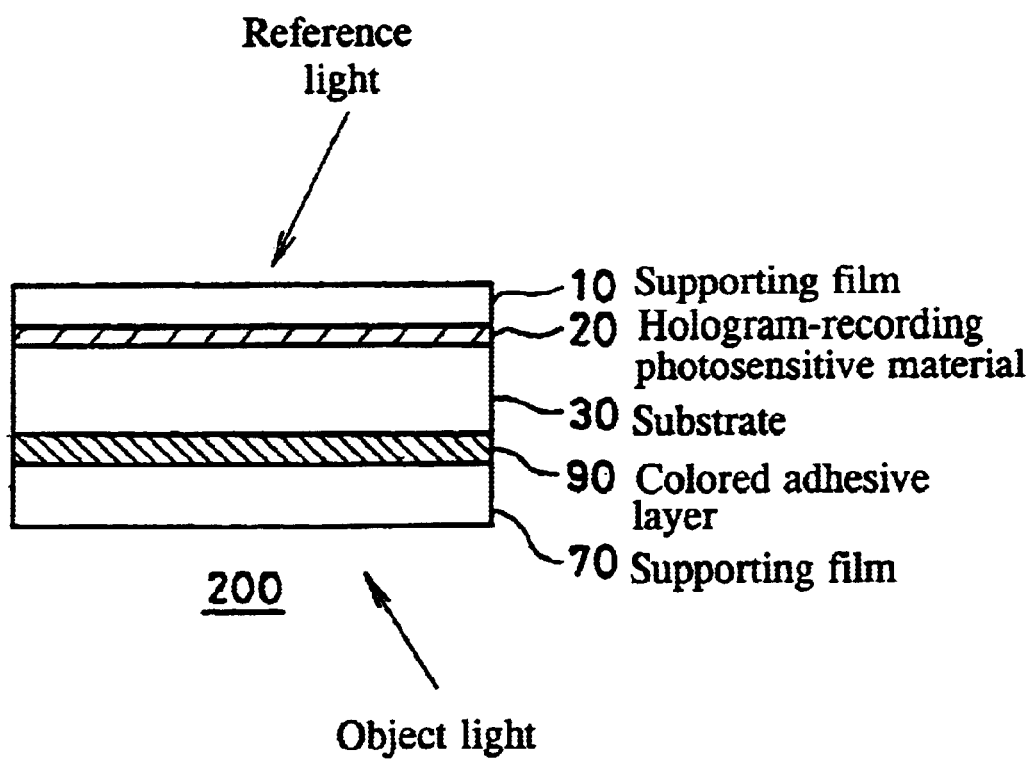
FIG. 14 is illustrative of the layer construction of another embodiment of the reflection hologram-recording dry plate according to the invention.

Here an account is given of the reflection hologram-recording dry plate fabricated by the inventive fabrication process and system as well as the materials that form it. Two exemplary layer constructions of a reflection hologram-recording dry plate 200 are shown in FIGS. 13 and 14. In FIG. 13, the dry plate 100 comprises, from the incidence side of reference light, a supporting film 10, a hologram-recording photosensitive material 20, a substrate 30, an adhesive layer 40 and a colored film 80. In FIG. 14, the dry plate 100 comprises, from the incidence side of reference light, a supporting film 10, a hologram-recording photosensitive material 20, a substrate 30, a colored adhesive layer 90 and a supporting film 70. It is here noted that for actual recording or reproduction, one or both of the supporting films 10 and 70 may be released and removed from the front and back surfaces of the hologram-recording photosensitive material 20 in the reflection hologram-recording dry plate 200.

In such layer constructions as shown in FIGS. 13 and 14, too, an adhesion-added, colored film comprising an adhesive layer 40 and a colored film 80 or a colored adhesive film comprising a colored adhesive layer 90 and a supporting film 70 may be laminated on the incidence side of reference light.

Figure 15:
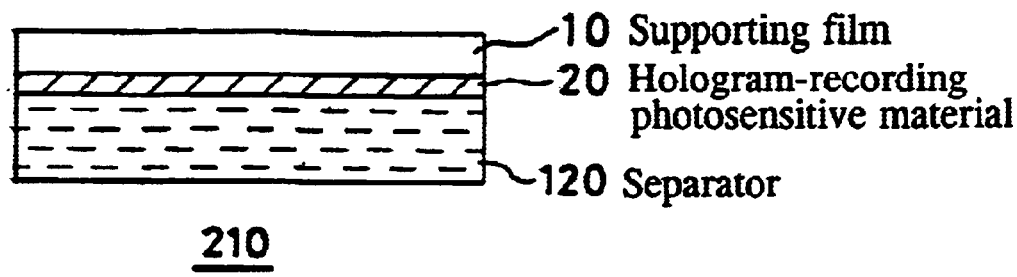
FIG. 15 is illustrative of the layer construction of a hologram-recording photosensitive film used for the fabrication of the reflection hologram-recording dry plate according to the invention.

A hologram-recording photosensitive film 210 herein used to fabricate the reflection hologram-recording dry plate 100 of such layer construction as shown in FIG. 13 or 14 comprises a supporting film 10, a hologram-recording photosensitive material 20 and a separator (release film) 120, as can be seen from the layer construction of FIG. 15. A film for adding light absorption to the back surface of the reflection hologram-recording dry plate 200 is an adhesion-added, colored film comprising a separator (release film) 140, an adhesive layer 40 and a colored film 80 as shown in FIG. 16(a), or a colored adhesive film 250 comprising a separator (release film) 140, a colored adhesive layer 90 and a supporting film 70 as shown in FIG. 16(b).

Figure 16:
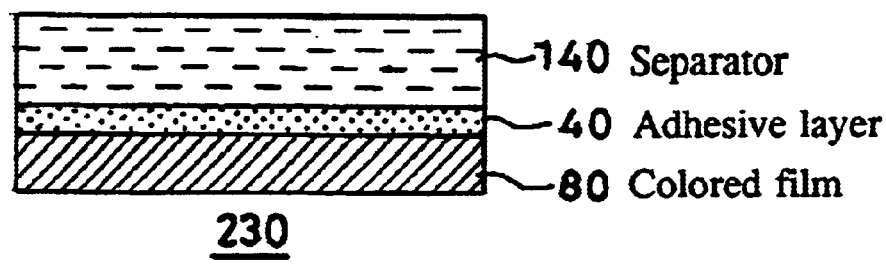
FIG. 16 is illustrative of the layer constructions of an adhesion-added, colored film, a colored adhesive film and an adhesion-added antireflection film used for the fabrication of the transmission hologram-recording dry plate according to the invention.
Figure 16:
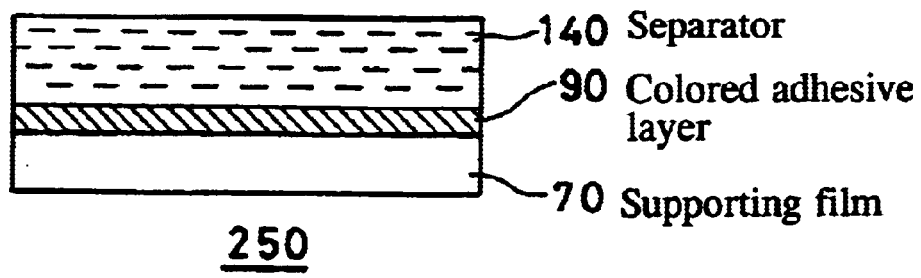
Figure 16:
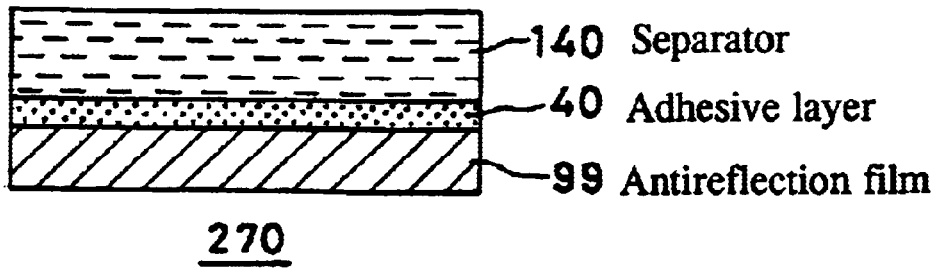

The same effect is expectable even when instead of the light absorption-adding film, an adhesion-added antireflection film comprising a separator (release film) 140, an adhesive layer 40 and an antireflection film 99 is laminated on the back side of the reflection hologram-recording dry plate 200 as shown in FIG. 16(c).

For the hologram-recording photosensitive material 20 in the hologram-recording photosensitive film 210 shown in FIG. 15, a photopolymer material having adhesion should preferably be used as a substrate 30. Of course, it is acceptable to use other photosensitive materials such as silver salts and bichromated gelatin. For selective release, as a matter of course, the release strengths between the supporting film 10 and the hologram-recording photosensitive material 20 and between the hologram-recording photosensitive material 20 and the separator 120 should conform to the following relation:

[supporting film 10/hologram-recording photosensitive material 20]≧[hologram-recording photosensitive material 20/separator 120]

For the supporting film 10 it is preferable to use PET film (of optical grade in particular); triacetyl cellulose film, polypropylene film, polyethylene film, polyvinyl chloride film, acrylic film, polyvinyl alcohol film and polyethylene vinyl alcohol copolymer film, all obtained by extrusion.

For the separator 120 such similar films as mentioned for the supporting film 10 may be used. However, it is preferable to use a film different in release properties from that supporting film 10. For the photopolymer photosensitive material used as the hologram-recording photosensitive material 20, for instance, Du Pont's photopolymers commercially available under the trade name of Omnidex may be used.

For the substrate 30, a variety of transparent rigid materials may be used; for instance, various glass substrates, polycarbonate substrates and acrylic substrates may be used. If necessary, it is preferable to subject the substrate to suitable primer treatments because some improvements in adhesion are obtainable. For instance, the glass substrates may be coated and dried with various silane coupling agents, acrylic adhesives, polyurethane adhesives, etc. The substrate 30 may be used in a dry film form.

An adhesion-added, colored film 230 shown in FIG. 16(a) is kept stable all the time during hologram recording. However, the colored film 230 must be removed without any remnants after recording. For selective release, the release strengths between the colored film 80 and the adhesive layer 40 and between the adhesive layer 40 and the separator 140 should satisfy the following relation:

[colored film 80/adhesive layer 40]≧[adhesive layer 40/separator 140]

For the colored film 80 it is preferable to use PET film (of optical grade in particular), triacetyl cellulose film, polypropylene film, polyethylene film, polyvinyl chloride film, acrylic film, polyvinyl alcohol film and polyethylene vinyl alcohol copolymer film, all obtained by extrusion and colored. Colored films are generally broken down into a film with pigments, dyes, etc. incorporated therein, a film dyed with a dye, a film coated with a pigment-containing resin, and a film coated with a dye-containing resin. It is noted, however, that pigments are unsuitable because they scatter laser light. It is therefore preferable to use dyes. The light absorption film 80 should preferably have such properties as disclosed in Japanese Patent Application No. 7-114329.

For the separator 140 such similar films as mentioned for the supporting film 10 may be used. However, it is preferable to use a film different in release properties from that supporting film 10. For the adhesives in the adhesive layer 40, for instance, use may be made of those based on rubber systems such as natural rubber, styrene-butadiene, polyisobutylene, isoprene, natural rubber latex and styrene-butadiene latex; acrylic systems such as acrylic and acrylic emulsion; silicone systems such as silicon; and hot-melt systems such as styrene-isoprene block copolymer, styrene-butadiene block copolymer, styrene-ethylene-butylene block copolymer and ethylene-vinyl acetate copolymer. Preferably, the adhesive in the adhesive layer 40 should have adhesion power decreasing by post-treatments such as heating and ultraviolet irradiation upon hologram exposure, and enable the colored film 80 to be easily removed from the substrate 30 without any remnants.

A colored adhesive film 250 shown in FIG. 16(b) is kept stable all the time during hologram recording. However, this 150 must be removed without any remnants after recording. For selective release, the release strengths between the supporting film 70 and the colored adhesive layer 90 and between the colored adhesive layer 90 and the separator 140 should satisfy the following relation:

[supporting film 70/colored adhesive layer 90]≧[colored adhesive layer 70/separator 140]

For the supporting film 70 it is preferable to use PET film (of optical grade in particular), triacetyl cellulose film, polypropylene film, polyethylene film, polyvinyl chloride film, acrylic film, polyvinyl alcohol film and polyethylene vinyl alcohol copolymer film, all obtained by extrusion.

For the separator 140 such similar films as mentioned for the supporting film 70 may be used. However, it is referable to use a film different in release properties from that supporting film 70. For the adhesives in the adhesive layer 60, for instance, use may be made of colored adhesives based on rubber systems such as natural rubber, styrene-butadiene, polyisobutylene, isoprene, natural rubber latex and styrene-butadiene latex; acrylic systems such as acrylic and acrylic emulsion; silicone systems such as silicon; and hot-melt systems such as styrene-isoprene block copolymer, styrene-butadiene block copolymer, styrene-ethylene-butylene block copolymer and ethylene-vinyl acetate copolymer. The adhesive may generally be colored by milling it with pigments, dyes or the like, or dyeing it with a dye. It is noted, however, that pigments are unsuitable because they scatter laser light. It is therefore preferable to use dyes. The colored adhesive film 90 should preferably have such properties as disclosed in JP-A 7-114329. Preferably, the adhesive in the colored adhesive layer 90 should also have adhesion power decreasing by post-treatments such as heating and ultraviolet irradiation upon hologram exposure, and enable the supporting film to be easily removed from the substrate 30 without any remnants.

To prevent unnecessary reflection at interfaces during recording, the indices of refraction of the substrate 30, adhesive layer 40, colored film 80 and colored adhesive layer 90 shown in FIGS. 13 and 14 should preferably be substantially equal to that of the hologram-recording photosensitive material 20. In other words, the preferable refractive index difference should preferably be up to 0.1.

As can be understood from the foregoing, the invention recited in any one of claims 1 to 7 provides a hologram-recording dry plate fabrication process that can be used to fabricate a transmission or reflection hologram-recording dry plate particularly best suited for applications where high precision and high cleanliness are required.

According to the invention recited in claim 7, it is possible to provide a hologram-recording dry plate fabrication process wherein the hologram-recording photosensitive material comprises a photopolymer having adhesion.

According to the hologram-recording dry plate fabrication system recited in claim 8 or 9, it is possible to fabricate a transmission or reflection hologram-recording dry plate particularly best suited for applications where high precision and high cleanliness are required.

According to the hologram-recording dry plate fabrication system recited in claim 10, any one of a sheet-cut form of hologram-recording photosensitive film comprising a supporting film, a hologram-recording photosensitive material and a separator, a sheet-cut form of adhesion-added light absorption film comprising a separator, an adhesive layer and a light absorption film and a sheet-cut form of light absorption adhesive film comprising a separator, a light absorption adhesive layer and a supporting film can be laminated on the substrate.

According to hologram-recording dry plate fabrication system recited in claim 11, any one of a sheet-cut form of hologram-recording photosensitive film comprising a supporting film, a hologram-recording photosensitive material and a separator, a sheet-cut form of adhesion-added, colored film comprising a separator, an adhesive layer and a colored film, a sheet-cut form of colored adhesive film comprising a separator, a colored adhesive layer and a supporting film and a sheet-cut form of adhesion-added antireflection film comprising a separator, an adhesive layer and an antireflection film can be laminated on the substrate.

What we claim is:

1. A hologram-recording dry plate fabrication process comprising steps of:
   providing a supply of plurality of discrete sheets of a sheet-cut form of hologram recording photosensitive film comprising a supporting film, a hologram recording photosensitive material and a separator, said supply of sheets being in a precut form and plural ones of said sheets being stored together in said pre-cut form;
   iteratively feeding discrete ones of a substrate one by one from a supply having a plurality of substrates to a lamination section stored in a horizontal supported orientation,
   converting said fed ones of a substrate from the horizontal orientation to a vertical supported orientation;
   iteratively positioning ones of said sheet-cut form of hologram recording photosensitive film adjacent ones of said substrate,
   releasing said separator from said fed ones of said sheet-cut form of hologram-recording photosensitive film, and
   laminating said ones of said sheet-cut form of hologram-recording photosensitive film from which said separator is released on one surface from a hologram recording photosensitive material side to ones of said substrate at said lamination section,
   wherein said separator-releasing step and/or said lamination step are carried out while said substrate and/or said hologram-recording photosensitive film are vertically supported.

2. The hologram-recording dry plate fabrication process according to claim 1, which comprises steps of:
   feeding a sheet-cut form of adhesion-added light absorption film comprising a second separator, an adhesive layer and a light absorption film or a sheet-cut form of light absorption adhesive film comprising a third separator, a light absorption adhesive layer and a second supporting film,
   releasing said second or third separator from said fed adhesion-added light absorption film or said fed light absorption adhesive film, and
   laminating said adhesion-added light absorption layer or light absorption adhesive film from which said second or third separator is released on the opposite side of said fed substrate from an adhesive layer or light absorption adhesive layer side.

3. The hologram-recording dry plate fabrication process according to claim 2, wherein said separator-releasing step and/or said lamination step are carried out while said substrate and said adhesion-added light absorption film or said light absorption adhesive film are vertically supported.

4. The hologram-recording dry plate fabrication process according to claim 3, wherein said hologram-recording photosensitive material comprises a photopolymer having adhesion.

5. The hologram-recording dry plate fabrication process according to claim 2, wherein said hologram-recording photosensitive material comprises a photopolymer having adhesion.

6. The hologram-recording dry plate fabrication process according to claim 1, which comprises steps of:
   feeding a sheet-cut form of adhesion-added, colored film comprising a second separator, an adhesive layer and a colored film, a sheet-cut form of colored adhesive film comprising a third separator, a colored adhesive layer and a supporting film or a sheet-cut form of adhesion-added antireflection film comprising a fourth separator, an adhesive layer and an antireflection film,
   releasing said second, third, or fourth separator from said fed adhesion-added, colored film, said fed colored adhesive film or said fed adhesion-added antireflection film, and
   laminating said fed adhesion-added, colored film, colored adhesive film or adhesion-added antireflection film from which said second, third, or fourth separator is released on the opposite side of said fed substrate from an adhesive layer or colored adhesive layer side.

7. The hologram-recording dry plate fabrication process according to claim 6, wherein said separator-releasing step and/or said lamination step are carried out while said substrate and said adhesion-added, colored film, said colored adhesive film or said adhesion-added antireflection film are vertically supported.

8. The hologram-recording dry plate fabrication process according to claim 7, wherein said hologram-recording photosensitive material comprises a photopolymer having adhesion.

9. The hologram-recording dry plate fabrication process according to claim 6, wherein said hologram-recording photosensitive material comprises a photopolymer having adhesion.

10. The hologram-recording dry plate fabrication process according to anyone of claim 1, wherein said hologram-recording photosensitive material comprises a photopolymer having adhesion.

11. A hologram-recording dry plate fabrication system comprising:

a substrate feeding means for iteratively feeding in a discrete manner, ones of a discrete substrate, stored in a horizontal supported orientation, a converter for converting said fed ones of a substrate from the horizontal orientation to a vertical supported orientation;

a supply of sheet-cut form film in a discrete pre-cut form, wherein plural ones of said sheets being stored together in said pre-cut form, said sheet cut form of film having a separator, a film feeding means for discretely feeding from said supply of plural sheet-cut form film, discrete ones of said sheet-cut form of film, one by one, said film being hologram-recording photosensitive material and said separator arranged to protect said film from dust and possible pressure exertable thereon during fabrication of the hologram-recording dry plate, a separator releasing means for releasing said separator from said fed film, and a lamination means for laminating said film from which said separator is released on one surface of said fed substrate from the side of the film from which the separator is released.

12. The hologram-recording dry plate fabrication system according to claim 11, which further includes a means for supporting said fed substrate vertically and a means for supporting said fed film vertically, so that while said substrate and/or said film are vertically supported, said separator is released from said film by said separator releasing means and said film is laminated on said substrate by said lamination means.

13. The hologram-recording dry plate fabrication system according to claim 11 or 12, wherein said film is any one of a sheet-cut form of hologram-recording photosensitive film comprising a supporting film, a hologram-recording photosensitive material and a separator, a sheet-cut form of adhesion-added light absorption film comprising a separator, an adhesive layer and a light absorption film and a sheet-cut form of light absorption adhesive film comprising a separator, a light absorption adhesive layer and a supporting film.

14. The hologram-recording dry plate fabrication system according to claim 11 or 12, wherein said film is any one of a sheet-cut form of hologram-recording photosensitive film comprising a supporting film, a hologram-recording photosensitive material and a separator, a sheet-cut form of adhesion-added, colored film comprising a separator, an adhesive layer and a colored film, a sheet-cut form of colored adhesive film comprising a separator, a colored adhesive layer and a supporting film and a sheet-cut form of adhesion-added antireflection film comprising a separator, an adhesive layer and an antireflection film.

15. The hologram-recording dry plate fabrication system according to claim 11 or 12, wherein said film is any one of a sheet-cut form of hologram-recording photosensitive film comprising a supporting film, a hologram-recording photosensitive material and said separator, a sheet-cut form of adhesion-added light absorption film comprising a separator, an adhesive layer and a light absorption film and a sheet-cut form of light absorption adhesive film comprising said separator, a light absorption adhesive layer and a supporting film, wherein said film has a side being vacuum-attractable by a sucking means for sucking said film said sucking means having a converting means to convert said film to a position accessible to said separator releasing means.

16. The hologram-recording dry plate fabrication system according to claim 11 or 12, wherein said film is any one of a sheet-cut form of hologram recording photosensitive film comprising a supporting film, a hologram-recording photosensitive material and said separator, a sheet-cut form of adhesion-added, colored film comprising a separator, an adhesive layer and a colored film, a sheet-cut form of colored adhesive film comprising said separator, a colored adhesive layer and a second supporting film and a sheet-cut form of adhesion added-antireflection film comprising said separator, an adhesive layer and an antireflection film wherein said film has a side being vacuum-attractable by a sucking means for sucking said film said sucking means having a converting means to convert said film to a position accessible to said separator releasing means.

17. A system for making hologram-recording dry plates comprising a substrate and a film, a film feeding means for iteratively and discretely feeding discrete ones of said film, said film having a removable separator, said substrate being held in a vertical position by a vertical support section, said film being positionable in a vertical position opposite said substrate, a separator release section for removing said separator thereby exposing said film, a lamination unit for laminating said film to said substrate, wherein said substrate is stored in a horizontal supported orientation, and wherein said system includes a horizontal to vertical converter for converting a substrate from the horizontal orientation to a vertical supported orientation for said film being positionable opposite thereto.

18. A system for making hologram-recording dry plates according to claim 17 wherein said film is any one of a sheet-cut form of hologram recording photosensitive film comprising a supporting film, a hologram-recording photosensitive material and said separator, a sheet-cut form of adhesion-added light absorbing film comprising said separator, an adhesive layer and light absorption film and a sheet-cut form of light absorption adhesive film comprising said separator, a light absorption adhesive layer and a supporting film.

19. A system for making hologram-recording dry plates according to claim 17 wherein said film is any one of a sheet-cut form of hologram recording photosensitive film comprising a supporting film, a hologram-recording photosensitive material and said separator, a sheet-cut form of adhesion-added colored film comprising said separator, an adhesive layer and colored film, a sheet-cut form of colored adhesive film comprising said separator, a colored adhesive layer and a second supporting film and a sheet-cut form of adhesive-added antireflection film comprising said separator, an adhesive layer and an antireflection film.

20. A system for making hologram-recording dry plates according to claim 17 wherein the film has a second separator on a surface opposite said separator and said second separator is removed in said separator release section, after said film is laminated in said lamination unit, a substrate ejection section for ejecting said substrate.

* * * * *